(12) United States Patent
Zhang et al.

(10) Patent No.: US 12,323,845 B2
(45) Date of Patent: Jun. 3, 2025

(54) PROCESSING METHOD OF ABNORMALLY BEHAVING UNMANNED AERIAL VEHICLE, NETWORK ELEMENT, SYSTEM, AND STORAGE MEDIUM

(71) Applicant: HUAWEI TECHNOLOGIES CO., LTD., Guangdong (CN)

(72) Inventors: Chengchen Zhang, Shanghai (CN); Wenfu Wu, Shanghai (CN); Qianghua Zhu, Reading (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 401 days.

(21) Appl. No.: 17/986,189

(22) Filed: Nov. 14, 2022

(65) Prior Publication Data

US 2023/0075589 A1    Mar. 9, 2023

Related U.S. Application Data

(63) Continuation of application No. PCT/CN2021/090411, filed on Apr. 28, 2021.

(30) Foreign Application Priority Data

May 15, 2020    (CN) .......................... 202010414573.4

(51) Int. Cl.
*H04W 28/02*    (2009.01)
*H04W 12/121*    (2021.01)

(52) U.S. Cl.
CPC ......... *H04W 28/02* (2013.01); *H04W 12/121* (2021.01)

(58) Field of Classification Search
None
See application file for complete search history.

(56) References Cited

U.S. PATENT DOCUMENTS

| | | | |
|---|---|---|---|
| 2017/0337219 A1* | 11/2017 | Ubhi | ...................... G08G 5/727 |
| 2018/0103036 A1* | 4/2018 | Fox | ...................... H04W 12/069 |
| 2021/0065566 A1* | 3/2021 | Li | .............................. B64C 1/36 |
| 2022/0398933 A1* | 12/2022 | Roy | ........................ G05D 1/101 |

OTHER PUBLICATIONS

3rd Generation Partnership Project, Technical Specification Group Services and System Aspects, Enhancement for Unmanned Aerial Vehicles, Stage 1 (Release 17) ,3GPP TR 22.829 V17.1.0(Sep. 2019), total 47 pages.

* cited by examiner

*Primary Examiner* — Brian S Roberts

(57) ABSTRACT

This application discloses a processing method of an abnormally behaving unmanned aerial vehicle, a network element, a system, and a storage medium, to detect a data packet for transmitting non-command and control (non-C2) data. According to the method, an SMF network element provides a first rule for a UPF network element, where the first rule indicates the UPF network element to detect, from a target transmission data packet, the data packet for transmitting the non-C2 data, and the target transmission data packet is a data packet between the UAV and the UAVC; the SMF network element receives a first session report sent by the UPF network element; and the SMF network element sends an abnormal traffic report to the first network element based on the first session report.

20 Claims, 14 Drawing Sheets

PROCESSING METHOD OF ABNORMALLY BEHAVING UNMANNED AERIAL VEHICLE, NETWORK ELEMENT, SYSTEM, AND STORAGE MEDIUM

CROSS-REFERENCE TO RELATED APPLICATIONS

This application is a continuation of International Patent Application No. PCT/CN2021/090411, filed on Apr. 28, 2021, which claims priority to Chinese Patent Application No. 202010414573.4, filed on May 15, 2020. The disclosures of the aforementioned applications are hereby incorporated by reference in their entireties.

TECHNICAL FIELD

Embodiments of this application relate to the field of communication technologies, and specifically, to a processing method of an abnormally behaving unmanned aerial vehicle, a network element, a system, and a storage medium.

BACKGROUND

An unmanned aerial vehicle (UAV) is an unmanned flight vehicle operated using a radio remote control device and a self-provided program control apparatus. In recent years, the UAV is more widely used due to its advantages such as informatization, automation, and no casualty risk during running in the air. Especially in the civil field, UAVs from small UAVs for personal entertainment to various UAVs that bring economic values, such as plant protection UAVs, emergency relief UAVs, fire fighting UAVs, and aerial surveying and mapping UAVs, are used. However, if there is no corresponding supervision means for wide use of the unmanned aerial vehicles, abnormal behaviors such as unlimited flight of the unmanned aerial vehicles may easily occur. For example, the unmanned aerial vehicles may enter a no-fly zone such as an airport or a military base. However, an abnormally behaving unmanned aerial vehicle is not allowed to transmit non-command and control (non-C2) data. For example, when approaching a military base, the abnormally behaving unmanned aerial vehicle is not allowed to perform operations such as photographing and video shooting.

In scenarios such as remote control, a conventional radio control mode is easily restricted. A mobile network has a feature of wide coverage. Therefore, connecting the unmanned aerial vehicle to the mobile network can widen application scenarios of the unmanned aerial vehicle. The 3rd generation partnership project (3GPP) is establishing a standard for a connected unmanned aerial vehicle.

For the abnormally behaving unmanned aerial vehicle, there are two conventional supervision means for preventing the non-C2 data from being continuously transmitted between the UAV and an unmanned aerial vehicle controller (UAVC). The first means is to directly disconnect the UAV from the UAVC, but in this case, the UAV is out of control due to loss of a connection to the UAVC. The second means is to directly switch the UAVC to an unmanned aerial system traffic management (UTM) network element or another specified controller, to control the unmanned aerial vehicle, but in this case, it is difficult to ensure seamless switching between different controllers. Consequently, the unmanned aerial vehicle is easily out of control. In addition, all abnormality is determined depending on the UTM, and this causes great management and control pressure on the UTM.

Therefore, for the abnormally behaving unmanned aerial vehicle, how to discover and process the non-C2 data transmitted between the UAV and the UAVC becomes an urgent problem to be resolved.

SUMMARY

Embodiments of this application provide a processing method of an abnormally behaving unmanned aerial vehicle, a network element, a system, and a storage medium, to detect a data packet for transmitting non-C2 data, and process the data packet for transmitting the non-C2 data.

According to a first aspect, an embodiment of this application provides a processing method of an abnormally behaving unmanned aerial vehicle. The method may include:

A session management function (SMF) network element provides a first rule for a user plane function (UPF) network element, where the first rule indicates the UPF network element to detect, from a target transmission data packet, a data packet for transmitting non-command and control (non-C2) data, and the target transmission data packet is a data packet between an unmanned aerial vehicle (UAV) and an unmanned aerial vehicle controller (UAVC);

the SMF network element receives a first session report sent by the UPF network element; and the SMF network element sends an abnormal traffic report to a first network element based on the first session report, where the abnormal traffic report includes one or more of identification information of the UAV, identification information of the UAVC, and identification information of an unmanned aerial system (UAS) including the UAV and the UAVC.

In the foregoing manner, the SMF network element provides the first rule for the UPF network element, so that the UPF network element not only detects, according to the first rule, the data packet for transmitting the non-C2 data, but also feeds back the first session report to the SMF network element. The SMF network element sends the abnormal traffic report to the first network element based on the first session report. In this way, the first network element having a supervision function can process, based on the abnormal traffic report, the data packet for transmitting the non-C2 data. This not only implements detection on the data packet for transmitting the non-C2 data, but also prevents, through processing by the first network element having the supervision function on the data packet for transmitting the non-C2 data, the data packet for transmitting the non-C2 data from being transmitted to the UAVC or the UAV.

Optionally, with reference to the first aspect, in a first possible implementation, before that an SMF network element provides a first rule for a UPF network element, the method may further include:

The SMF network element receives an abnormal data detection request sent by the first network element.

Correspondingly, that an SMF network element provides a first rule for a UPF network element may include:

The SMF network element provides the first rule for the UPF network element based on the abnormal data detection request.

In the foregoing manner, the abnormal data detection request indicates that the first network element has determined that a flight behavior of the UAV is abnormal. Therefore, the SMF network element provides the first rule for the UPF network element as triggered by the abnormal data detection request, so that the UPF network element further detects the target transmission data packet transmitted between the abnormal UAV and the UAVC, to detect the data packet for transmitting the non-C2 data. This provides multiple operabilities for triggering detection by the UPF network element.

Optionally, with reference to the first possible implementation of the first aspect, in a second possible implementation, the abnormal data detection request includes one or more of the identification information of the UAV, the identification information of the UAVC, the identification information of the UAS, and a session identifier, and the session identifier indicates a session for data transmission between the UAV and the UAVC.

In the foregoing manner, the abnormal data detection request includes one or more of the identification information of the UAV, the identification information of the UAVC, the identification information of the UAS, and the session identifier, so that the SMF network element can limit a data packet detection range based on one or more of the identification information. The identification information of the UAV may be used to limit a detection range to UE corresponding to the identification information of the UAV, where the UE is a destination side or a source side; with reference to the identification information of the UAVC on the other side, the detection range may be further limited to a data packet whose source side is the UAV and whose destination side is the UAVC: or the detection range is further limited to a data packet whose source side is the UAVC and whose destination side is the UAV. This provides a plurality of manners for limiting the data packet detection range, to implement flexible detection.

Optionally, with reference to the first aspect or the first and the second possible implementations of the first aspect, in a third possible implementation, the first session report includes an abnormal characteristic of the data packet for transmitting the non-C2 data, the abnormal characteristic includes one or more of abnormality of a data packet size, abnormality of a ratio of a quantity of uplink data packets to a quantity of downlink data packets, or abnormality of a transmission rate of the uplink/downlink data packet, and the method further includes:

The SMF network element determines a second rule based on the abnormal rule, the forwarding rule is for forwarding, to the first network element or a first apparatus, the data packet for transmitting the non-C2 data, and the first apparatus is a third-party entity configured to control the UAV; and the SMF network element sends the second rule to the UPF network element.

In the foregoing manner, the SMF network element determines the corresponding second rule, for example, one of the packet discarding rule, the cache rule, or the forwarding rule, based on the abnormal characteristic in the first session report. In this way, the second rule is sent to the UPF network element, so that the UPF network element synchronously processes the data packet for transmitting the non-C2 data. This provides a plurality of flexible processing manners with a high operability.

Optionally, with reference to the first aspect or the first to the third possible implementations of the first aspect, in a fourth possible implementation, the first rule may include one or more of a threshold of the data packet size, a threshold of the ratio of the quantity of uplink data packets to the quantity of downlink data packets, and a threshold of the transmission rate of the uplink/downlink data packet.

In the foregoing manner, one or more of the threshold of the data packet size, the threshold of the ratio of the quantity of uplink data packets to the quantity of downlink data packets, and the threshold of the transmission rate of the uplink/downlink data packet may be used as a detection condition for the UPF network element to detect the data packet for transmitting the non-C2 data. This improves detection accuracy.

For example, the UPF network element may compare the data packet size of the target transmission data packet with a threshold of a size of a single data packet. When the data packet size of the target transmission data packet is greater than the threshold of the size of the single data packet, it means that the target transmission data packet may be not for transmitting C2 data. In this way, the UPF network element may determine, as the data packet for transmitting non-C2 data, the target transmission data packet whose data packet size is greater than the threshold of the size of the single data packet. Another detection condition is similar.

Optionally, with reference to the first aspect or the first to the fourth possible implementations of the first aspect, in a fifth possible implementation, the method may further include:

The SMF network element sends a detection duration to the UPF network element, so that the UPF network element detects, within the detection duration from the target transmission data packet according to the first rule, the data packet for transmitting the non-C2 data.

In the foregoing manner, the SMF network element provides the detection duration for the UPF network element, so that the UPF network element can start a timer based on a local configuration, to detect, within the detection duration according to the first rule, the data packet for transmitting the non-C2 data. In addition, if the UPF network element does not detect, when the detection duration expires, the data packet for transmitting the non-C2 data, the UPF can also determine that the data packet for transmitting the non-C2 data exists in the target transmission data packet, to report abnormality to the SMF network element. This provides a plurality of detection manners and enriches a detection process.

According to a second aspect, an embodiment of this application provides a processing method of an abnormally behaving unmanned aerial vehicle. The method may include:

A user plane function (UPF) network element obtains a first rule:

The UPF network element detects, from a target transmission data packet according to the first rule, a data packet for transmitting non-command and control (non-C2) data, where the target transmission data packet is a data packet between an unmanned aerial vehicle (UAV) and an unmanned aerial vehicle controller (UAVC); and the UPF network element sends a first session report to an SMF network element.

In the foregoing manner, the UPF network element obtains the first rule, detects, from the target transmission data packet according to the first rule, the data packet for transmitting the non-C2 data, and can further feed, back to the SMF network element in a form of the first session report, information about the detected data packet for transmitting the non-C2 data, to implement detection on the data packet for transmitting the non-C2 data, and further enable a first network element to process the data packet for transmitting the non-C2 data. This prevents the data packet for transmitting the non-C2 data from being transmitted to the UAVC or the UAV.

Optionally, with reference to the second aspect, in a first possible implementation, after that the UPF network element sends a first session report to an SMF network element, the method may further include:

The UPF network element receives a second rule sent by the SMF network element, where the second rule includes one of a packet discarding rule, a cache rule, or a forwarding rule, the forwarding rule is for forwarding, to the first network element or a first apparatus, the data packet for transmitting the non-C2 data, and the first apparatus is a third-party entity configured to control the UAV; and the UPF network element processes, according to one of the packet discarding rule, the cache rule, or the forwarding rule, the data packet for transmitting the non-C2 data.

In the foregoing manner, after receiving the second rule sent by the SMF network element, the UPF network element may synchronously process, according to one of the packet discarding rule, the cache rule, or the forwarding rule, the data packet for transmitting the non-C2 data. For example, the data packet for transmitting the non-C2 data is correspondingly discarded, cached, or forwarded to the first network element or the first apparatus for processing. In addition, a data packet for transmitting C2 data can be normally transmitted to the UAV or the UAVC, or forwarded to the first network element or the first apparatus. This provides a plurality of flexible processing manners with a high operability.

Optionally, with reference to the second aspect or the first possible implementation of the second aspect, in a second possible implementation, the first session report includes an abnormal characteristic of the data packet for transmitting the non-C2 data, and the abnormal characteristic includes one or more of abnormality of a data packet size, abnormality of a ratio of a quantity of uplink data packets to a quantity of downlink data packets, or abnormality of a transmission rate of the uplink/downlink data packet, where the abnormality of the data packet size is abnormality that the data packet size of the target transmission data packet is greater than a threshold of a size of a single data packet that is in the first rule, the abnormality of the ratio of the quantity of uplink data packets to the quantity of downlink data packets is abnormality that the ratio of the quantity of uplink data packets in the target transmission data packet to the quantity of downlink data packets in the target transmission data packet is not equal to a threshold of the ratio of the quantity of uplink data packets to the quantity of downlink data packets that is in the first rule, or abnormality that the ratio of the quantity of uplink data packets to the quantity of downlink data packets does not fall within a range corresponding to the threshold of the ratio of the quantity of uplink data packets to the quantity of downlink data packets, and the abnormality of the transmission rate of the uplink/downlink data packet is abnormality that the transmission rate of the uplink/downlink data packet is greater than a threshold of the transmission rate of the uplink/downlink data packet that is in the first rule.

In the foregoing manner, one or more of the threshold of the data packet size, the threshold of the ratio of the quantity of uplink data packets to the quantity of downlink data packets, and the threshold of the transmission rate of the uplink/downlink data packet may be used as a detection condition for the UPF network element to detect the data packet for transmitting the non-C2 data. This can not only improve detection accuracy, but also determine the corresponding abnormal characteristic, to lay a foundation for the SMF network element to subsequently determine the second rule.

According to a third aspect, an embodiment of this application provides a processing method of an abnormally behaving unmanned aerial vehicle. The method may include:

A first network element determines that a flight behavior of an unmanned aerial vehicle (UAV) is abnormal; and The first network element sends an abnormal data detection request to a session management function (SMF) network element, to indicate the SMF network element to provide a first rule for a user plane function (UPF) network element based on the abnormal data detection request, where the first rule indicates the UPF network element to detect, from a target transmission data packet, a data packet for transmitting a non-command and control (non-C2) data packet, and the target transmission data packet is a data packet between the UAV and an unmanned aerial vehicle controller (UAVC).

In the foregoing manner, when determining that the flight behavior of the UAV is abnormal, the first network element indicates, using the abnormal data detection request, the SMF network element to provide the first rule for the UPF network element. This not only enables the UPF network element to detect the data packet for transmitting the non-C2 data, but also enables the first network element to process the data packet for transmitting the non-C2 data, to further prevent the data packet for transmitting the non-C2 data from being transmitted to the UAVC or the UAV.

Optionally, with reference to the third aspect, in a first possible implementation, the abnormal data detection request further includes one or more of identification information of the UAV, identification information of the UAVC, identification information of an unmanned aerial system (UAS) including the UAV and the UAVC, and a session identifier, and the session identifier indicates a session for data transmission between the UAV and the UAVC.

In the foregoing manner, the abnormal data detection request includes one or more of the identification information of the UAV, the identification information of the UAVC, the identification information of the UAS, and the session identifier, so that the SMF network element can limit a data packet detection range based on one or more of the identification information. The identification information of the UAV may be used to limit a detection range to UE corresponding to the identification information of the UAV, where the UE is a destination side or a source side; with reference to the identification information of the UAVC on the other side, the detection range may be further limited to a data packet whose source side is the UAV and whose destination side is the UAVC: or the detection range is further limited to a data packet whose source side is the UAVC and whose destination side is the UAV. This provides a plurality of manners for limiting the data packet detection range, to implement flexible detection.

Optionally, with reference to the third aspect or the first possible implementation of the third aspect, in a second possible implementation, after that the first network element sends an abnormal data detection request to an SMF network element, the method may further include:

The first network element receives an abnormal traffic report sent by the SMF network element, where the abnormal traffic report includes one or more of the identification information of the UAV, the identification information of the UAVC, and the identification information of the unmanned aerial system (UAS) including the UAV and the UAVC.

In the foregoing manner, the first network element may process, based on the abnormal traffic report, the data packet for transmitting the non-C2 data, for example, forward the data packet to the first network element or a first apparatus. The first apparatus is a third-party entity configured to control the UAV. This prevents the data packet for transmitting the non-C2 data from being transmitted to the UAVC or the UAV.

Optionally, with reference to the third aspect or the first and the second possible implementations of the third aspect, in a third possible implementation, before that the first network element sends an abnormal data detection request to an SMF network element, the method may further include:

The first network element sends indication information to the UAV or the UAVC, where the indication information indicates the UAV or the UAVC to stop transmitting the non-C2 data.

In the foregoing manner, by sending the indication information to the UAV or the UAVC, the first network element indicates in advance the UAV or the UAVC to stop transmitting the non-C2 data, which plays a role of pre-notification. This can lay a foundation for subsequent detection on the data packet for transmitting the non-C2 data.

According to a fourth aspect, an embodiment of this application provides a session management function network element. The session management function network element may include:

A providing unit, configured to provide a first rule for a user plane function (UPF) network element, where the first rule indicates the UPF network element to detect, from a target transmission data packet, a data packet for transmitting non-command and control (non-C2) data, and the target transmission data packet is a data packet between an unmanned aerial vehicle (UAV) and an unmanned aerial vehicle controller (UAVC);

a receiving unit, configured to receive a first session report sent by the UPF network element; and a sending unit, configured to send an abnormal traffic report to a first network element based on the first session report received by the receiving unit, where the abnormal traffic report includes one or more of identification information of the UAV, identification information of the UAVC, and identification information of an unmanned aerial system (UAS) including the UAV and the UAVC.

Optionally, with reference to the fourth aspect, in a first possible implementation, the receiving unit is further configured to: before the providing unit provides the first rule for the UPF network element, receive an abnormal data detection request sent by the first network element; and correspondingly, the providing unit is configured to provide the first rule for the UPF network element based on the abnormal data detection request received by the receiving unit.

Optionally, with reference to the fourth aspect or the first possible implementation of the fourth aspect, in a second possible implementation, the first session report includes an abnormal characteristic of the data packet for transmitting the non-C2 data, the abnormal characteristic includes one or more of abnormality of a data packet size, abnormality of a ratio of a quantity of uplink data packets to a quantity of downlink data packets, or abnormality of a transmission rate of the uplink/downlink data packet, and the session management function network element may further include:

a determining unit, configured to determine a second rule based on the abnormal rule, the forwarding rule is for forwarding, to the first network element or a first apparatus, the data packet for transmitting the non-C2 data, and the first apparatus is a third-party entity configured to control the UAV, where the sending unit is configured to send the second rule to the UPF network element.

Optionally, with reference to the fourth aspect or the first and the second possible implementations of the fourth aspect, in a third possible implementation, the sending unit is configured to send a detection duration to the UPF network element, so that the UPF network element detects, within the detection duration from the target transmission data packet according to the first rule, the data packet for transmitting the non-C2 data.

According to a fifth aspect, an embodiment of this application provides a user plane function network element. The user plane function network element may include:

an obtaining unit, configured to obtain a first rule:

a detection unit, configured to detect, from a target transmission data packet according to the first rule obtained by the obtaining unit, a data packet for transmitting non-command and control (non-C2) data, where the target transmission data packet is a data packet between an unmanned aerial vehicle (UAV) and an unmanned aerial vehicle controller (UAVC); and a sending unit, configured to send a first session report to an SMF network element.

Optionally, with reference to the fifth aspect, in a first possible implementation, the user plane function network element may further include a processing unit, where the receiving unit is further configured to: after the sending unit sends the first session report to the SMF network element, receive a second rule sent by the SMF network element, where the second rule includes one of a packet discarding rule, a cache rule, or a forwarding rule, the forwarding rule is for forwarding, to a first network element or a first apparatus, the data packet for transmitting the non-C2 data, and the first apparatus is a third-party entity configured to control the UAV; and the processing unit is configured to process, according to one of the packet discarding rule, the cache rule, or the forwarding rule, the data packet for transmitting the non-C2 data.

According to a sixth aspect, an embodiment of this application provides a first network element. The first network element may include:

a detection unit, configured to detect a flight behavior of an unmanned aerial vehicle (UAV); and a sending unit, configured to: when the flight behavior of the UAV is abnormal, send an abnormal data detection request to a session management function (SMF) network element, to indicate the SMF network element to provide a first rule for a user plane function (UPF) network element based on the abnormal data detection request, where the first rule indicates the UPF network element to detect, from a target transmission data packet, a data packet for transmitting a non-command and control (non-C2) data packet, and the target transmission data packet is a data packet between the UAV and an unmanned aerial vehicle controller (UAVC).

Optionally, with reference to the sixth aspect, in a first possible implementation, the first network element may further include:

A receiving unit, configured to: after the sending unit sends the abnormal data detection request to the SMF network element, receive an abnormal traffic report sent by the SMF network element, where the abnormal traffic report includes one or more of identification information of the UAV, identification information of the UAVC, and identification information of an unmanned aerial system (UAS) including the UAV and the UAVC.

Optionally, with reference to the sixth aspect or the first possible implementation of the sixth aspect, in a second possible implementation, the sending unit is further configured to: before sending the abnormal data detection request to the SMF network element, send indication information to the UAV or the UAVC, where the indication information indicates the UAV or the UAVC to stop transmitting the non-C2 data.

According to a seventh aspect, an embodiment of this application provides a processing system of an abnormally behaving unmanned aerial vehicle. The processing system may include a session management function (SMF) network element and a user plane function SMF network element, where The SMF network element is configured to provide a first rule for the UPF network element, where the first rule indicates the UPF network element to detect, from a target transmission data packet, a data packet for transmitting non-command and control (non-C2) data, and the target transmission data packet is a data packet between an unmanned aerial vehicle (UAV) and an unmanned aerial vehicle controller (UAVC):

the UPF network element is configured to: obtain the first rule, detect, from the target transmission data packet according to the first rule, the data packet for transmitting the non-command and control (non-C2) data, and send a first session report to the SMF network element, where the first session report indicates that the data packet for transmitting the non-C2 data is detected in the target transmission data packet; and the SMF network element is configured to: receive the first session report, and send an abnormal traffic report to a first network element based on the first session report, where the abnormal traffic report includes one or more of identification information of the UAV, identification information of the UAVC, and identification information of an unmanned aerial system (UAS) including the UAV and the UAVC.

Optionally, with reference to the possible implementation of the seventh aspect, in a first possible implementation, the processing system may further include the first network element, where The first network element is configured to: detect a flight behavior of the unmanned aerial vehicle (UAV), and send an abnormal data detection request to the SMF network element when the flight behavior of the UAV is abnormal; and the SMF network element is configured to: before providing the first rule for the UPF network element, receive the abnormal data detection request sent by the first network element, and provide the first rule for the UPF network element based on the abnormal data detection request.

Optionally, with reference to the seventh aspect or the first possible implementation of the seventh aspect, in a second possible implementation, the SMF network element is configured to: determine a second rule based on an abnormal characteristic, and send the second rule to the UPF network element, where the first session report includes the abnormal characteristic of the data packet for transmitting the non-C2 data, the abnormal characteristic includes one or more of abnormality of a data packet size, abnormality of a ratio of a quantity of uplink data packets to a quantity of downlink data packets, or abnormality of a transmission rate of the uplink/downlink data packet, the second rule indicates to process the data packet for transmitting the non-C2 data, the second rule includes one of a packet discarding rule, a cache rule, or a forwarding rule, the forwarding rule is for forwarding, to the first network element or a first apparatus, the data packet for transmitting the non-C2 data, and the first apparatus is a third-party entity configured to control the UAV; and the UPF network element is configured to: receive the second rule, and process, according to one of the packet discarding rule, the cache rule, or the forwarding rule, the data packet for transmitting the non-C2 data.

Optionally, with reference to the seventh aspect or the first and the second possible implementations of the seventh aspect, in a third possible implementation, the SMF network element is configured to send a first indication to the UPF network element, where the first indication indicates the UPF network element to detect, within a detection duration from the target transmission data packet according to the first rule, the data packet for transmitting the non-C2 data; and the UPF network element is configured to: receive the detection duration, and detect, within the detection duration from the target transmission data packet according to the first rule, the data packet for transmitting the non-C2 data.

Optionally, with reference to the seventh aspect or the first to the third possible implementations of the seventh aspect, in a fourth possible implementation, The first network element is configured to: after sending the abnormal data detection request to the SMF network element, receive the abnormal traffic report sent by the SMF network element, where the abnormal traffic report includes one or more of the identification information of the UAV, the identification information of the UAVC, and the identification information of the unmanned aerial system (UAS) including the UAV and the UAVC.

Optionally, with reference to the seventh aspect or the first to the fourth possible implementations of the seventh aspect, in a fifth possible implementation, the first network element is configured to: before sending the abnormal data detection request to the SMF network element, send indication information to the UAV or the UAVC, where the indication information indicates the UAV or the UAVC to stop transmitting the non-C2 data.

According to an eighth aspect, an embodiment of this application provides a session management function network element, including a processor and a memory. The memory is configured to store program instructions. When the session management function network element runs, the processor executes the program instructions stored in the memory, so that the session management function network element performs the processing method of an abnormally behaving unmanned aerial vehicle in any one of the first aspect or the possible implementations of the first aspect.

According to a ninth aspect, an embodiment of this application provides a user plane function network element, including a processor and a memory. The memory is configured to store program instructions. When the user plane function network element runs, the processor executes the program instructions stored in the memory, so that the user plane function network element performs the processing method of an abnormally behaving unmanned aerial vehicle in any one of the second aspect or the possible implementations of the second aspect.

According to a tenth aspect, an embodiment of this application provides a first network element, including a processor and a memory. The memory is configured to store program instructions. When the first network element runs, the processor executes the program instructions stored in the memory, so that the first network element performs the processing method of an abnormally behaving unmanned aerial vehicle in any one of the third aspect or the possible implementations of the third aspect.

According to an eleventh aspect, an embodiment of this application provides a computer-readable storage medium, including instructions. When the instructions are run on a computer, the computer is enabled to perform the method in any one of the first aspect or the possible implementations of the first aspect.

According to a twelfth aspect, an embodiment of this application provides a computer-readable storage medium, including instructions. When the instructions are run on a computer, the computer is enabled to perform the method in any one of the second aspect or the possible implementations of the second aspect.

According to a thirteenth aspect, an embodiment of this application provides a computer-readable storage medium, including instructions. When the instructions are run on a computer, the computer is enabled to perform the method in any one of the third aspect or the possible implementations of the third aspect.

According to a fourteenth aspect, an embodiment of this application provides a computer program product, including instructions. When the computer program product runs on a computer, the computer is enabled to perform the method in any one of the first aspect or the possible implementations of the first aspect.

According to a fifteenth aspect, an embodiment of this application provides a computer program product, including instructions. When the computer program product runs on a computer, the computer is enabled to perform the method in any one of the second aspect or the possible implementations of the second aspect.

According to a sixteenth aspect, an embodiment of this application provides a computer program product, including instructions. When the computer program product runs on a computer, the computer is enabled to perform the method in any one of the third aspect or the possible implementations of the third aspect.

According to a seventeenth aspect, an embodiment of this application provides a chip system. The chip system includes a processor, configured to support a session management function network element in implementing a function in any one of the first aspect or the possible implementations of the first aspect. In a possible design, the chip system further includes a memory, where the memory is configured to store program instructions and data that are necessary for the session management function network element. The chip system may include a chip, or may include a chip and another discrete component.

According to an eighteenth aspect, an embodiment of this application provides a chip system. The chip system includes a processor, configured to support a user plane function network element in implementing a function in any one of the second aspect or the possible implementations of the second aspect. In a possible design, the chip system further includes a memory, where the memory is configured to store program instructions and data that are necessary for the user plane function network element. The chip system may include a chip, or may include a chip and another discrete component.

According to a nineteenth aspect, an embodiment of this application provides a chip system. The chip system includes a processor, configured to support a first network element in implementing a function in any one of the third aspect or the possible implementations of the third aspect. In a possible design, the chip system further includes a memory, where the memory is configured to store program instructions and data that are necessary for the first network element. The chip system may include a chip, or may include a chip and another discrete component.

According to the foregoing technical solutions, it can be learned that embodiments of this application have the following advantages:

In embodiments of this application, the SMF network element provides the first rule for the UPF network element, and the UPF network element not only detects, according to the first rule, the data packet for transmitting the non-C2 data, but also feeds back the first session report to the SMF network element, so that the SMF network element sends the abnormal traffic report to the first network element based on the first session report. In this way, the first network element having the supervision function can process, based on the abnormal traffic report, the data packet for transmitting the non-C2 data. This not only implements discovering and detection of the data packet for transmitting the non-C2 data, but also prevents, through the processing by the first network element having the supervision function on the data packet for transmitting the non-C2 data, the data packet for transmitting the non-C2 data from being transmitted to the UAVC or the UAV.

BRIEF DESCRIPTION OF DRAWINGS

To describe technical solutions in embodiments of this application more clearly, the following briefly describes accompanying drawings used in descriptions of embodiments. Evidently, the accompanying drawings in the following descriptions show merely some embodiments of this application.

DESCRIPTION OF EMBODIMENTS

Figure 1:
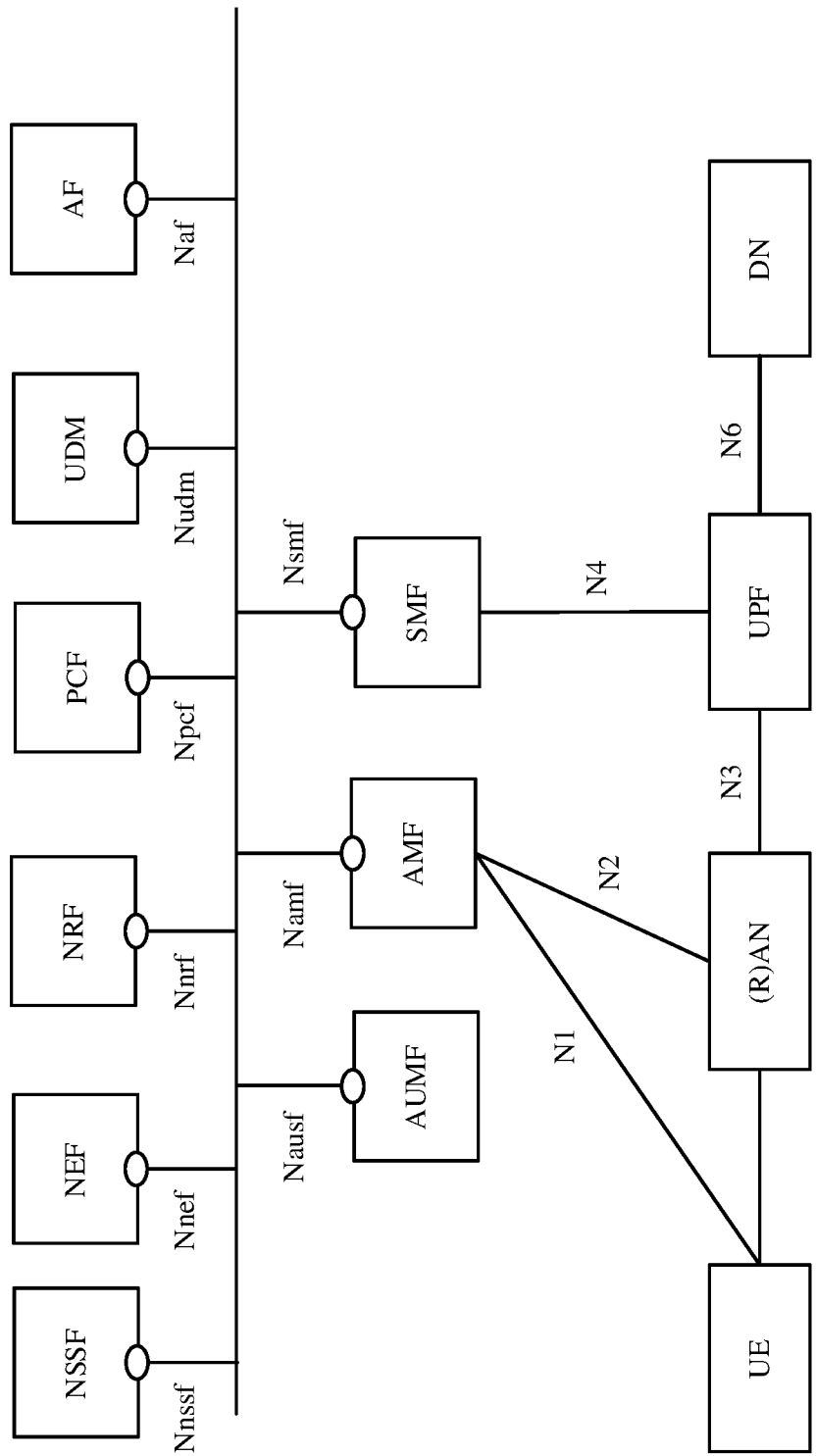
FIG. 1 is a schematic diagram of a system architecture according to an embodiment of this application.

Embodiments of this application provide a processing method of an abnormally behaving unmanned aerial vehicle, a network element, a system, and a storage medium, to detect a data packet for transmitting non-C2 data, and process the data packet for transmitting the non-C2 data.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments of this application described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

As an unmanned aerial vehicle technology becomes mature, application of an unmanned aerial vehicle has gradually pervaded from a military application field to a civil field. If there is no complete processing measure for an abnormally behaving unmanned aerial vehicle, and the unmanned aerial vehicle is still continued to be allowed to transmit non-C2 to an unmanned aerial vehicle controller, a great threat is inevitably posed to public security. However, in an existing means for preventing the non-C2 data from being transmitted between the unmanned aerial vehicle and the unmanned aerial vehicle controller, the unmanned aerial vehicle needs to be disconnected from the unmanned aerial vehicle controller, or the unmanned aerial vehicle controller needs to be switched to a UTM network element or another specified controller to control the unmanned aerial vehicle. However, the unmanned aerial vehicle is easily out of control.

Networks such as a $4^{th}$ generation (4G) network and a $5^{th}$ generation (5G) network may be referred to as mobile networks. From a perspective of a service, the mobile network may include a radio access network (RAN) and a core network (CN). The RAN may be connected to the CN. The RAN is responsible for user access, and the CN is responsible for service processing. The RAN includes, but is not limited to, a base station.

Currently, mobile networks are widely deployed, and are applicable to unmanned aerial vehicles from different vendors. Therefore, this application mainly provides a processing method of the abnormally behaving unmanned aerial vehicle from perspectives of a user plane and a control plane, to find whether a flight behavior of the unmanned aerial vehicle is abnormal, and when the flight behavior is abnormal, process the non-C2 data transmitted between the unmanned aerial vehicle and the unmanned aerial vehicle controller. The processing method of the abnormally behaving unmanned aerial vehicle provided in this application may be applied to a 4G network, a 5G network, another future 6G network, a communication system, or the like. The following first describes a 5G network structure applicable to this application with reference to the accompanying drawings.

FIG. 1 is a schematic diagram of a system architecture according to an embodiment of this application.

As shown in FIG. 1, the system architecture is a schematic diagram of a system architecture of a 5G network. The system architecture not only supports access to a core network side using a radio technology defined by a 3GPP standard group, but also supports access to the core network side using a non-3GPP interworking function (N3IWF), a next generation access gateway (ngPDG), a fixed network access gateway, or a trusted non-3GPP access gateway in a non-3GPP access technology.

User equipment (UE), a (radio) access network ((R)AN), a user plane function (UPF) network element, and a data network (DN) in FIG. 1 are generally referred to as user layer network functions or entities, and data traffic of a user may be transmitted through a data transmission channel established between the UE and the DN.

The UE may include: a handheld terminal, a notebook computer, a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, or another device that can access a network. The UE and an access network device communicate with each other using an air interface technology.

An access network (AN) may also be referred to as a radio access network (RAN) in specific application, and the RAN includes an access network device and is responsible for access of the user equipment. A RAN device in the 5G network may be a next generation (NG) RAN device, or may be an evolved universal terrestrial radio access network (E-UTRAN) device. The 5G network may be connected to both the two access network devices. In this embodiment, the RAN may be a next generation NodeB (gNB) or a next generation-evolved NodeB (ng-eNB). The gNB provides a user plane function and a control plane function of new radio (NR) for the UE, and the ng-eNB provides a user plane function and a control plane function of evolved universal terrestrial radio access (E-UTRA) for the UE. It should be noted that, the gNB and the ng-eNB are merely names, indicate base stations that support a 5G network system, and are not intended for limitation.

The data network (DN) may be an external network of a carrier, or may be a network controlled by a carrier, and is configured to provide a business service to a user. The UE may access the DN by accessing a carrier network, and use a service provided by the carrier or a third party on the DN.

Other network elements in FIG. 1 are referred to as control layer network functions or entities, and are mainly responsible for user registration authentication, mobility management, delivering a data packet forwarding policy, a QoS control policy, or the like to the user plane function (UPF) network element, or the like. A session management function (SMF) network element is mainly responsible for user plane network element selection, user plane network element redirection, internet protocol (IP) address allocation, bearer establishment, modification, and release, or the like. An access and mobility management function (AMF) network element is mainly responsible for signaling processing, for example, functions such as access control, mobility management, attach and detach, and network element selection.

Specifically, as shown in FIG. 1, the user equipment (UE) may be connected to the AMF network element via the RAN, the AMF network element is separately connected to network elements such as the SMF network element and a unified data management (UDM) function, the SMF network element is connected to the UPF network element, and the UPF network element is connected to the DN. Interfaces and connections in the system architecture may include N1, N2, N3, N4, and N6. N1 is a control plane connection between the UE and the AMF network element, and is configured to transmit control signaling between the user equipment and a core network control plane. Specifically, a message in the N1 connection may be transmitted through a connection between the UE and the RAN or an N2 connection between the RAN and the AMF network element. N2 is a control plane connection between the RAN and the AMF network element. N3 is a connection between the RAN and the UPF network element. N4 is a connection between the SMF network element and the UPF network element, and is configured to transmit control signaling between the SMF network element and the UPF network element. N6 is a connection between the UPF network element and the DN.

In addition, the control layer network function or entity may further include a policy control function (PCF) network element. The PCF network element is mainly responsible for providing a unified policy framework to control a network behavior, providing a policy rule for the control layer network function, and obtaining policy decision-related subscription information of the user. An application function (AF) network element mainly supports interaction with the 3rd generation partnership project (3GPP) core network to provide a service, for example, a service that affects a data routing decision or a policy control function, or some third-party services provided for a network side. A network slice selection function (NSSF) network element is mainly configured to select a network slice. An AUSF (Authentication Server Function) network element mainly provides functions of authentication and authorization. The unified data management (UDM) network element may be configured to perform location management and subscription management. A network exposure function (NEF) network element mainly supports secure interaction between a 3GPP network and a third-party application. The NEF network element can securely expose a network capability and an event to a third party, to enhance or improve application service quality. The 3GPP network may also securely obtain related data from the third party, to enhance intelligent decision of the network. In addition, the network element supports restoration of structured data from a unified database or storage of structured data in a unified database.

Figure 2:
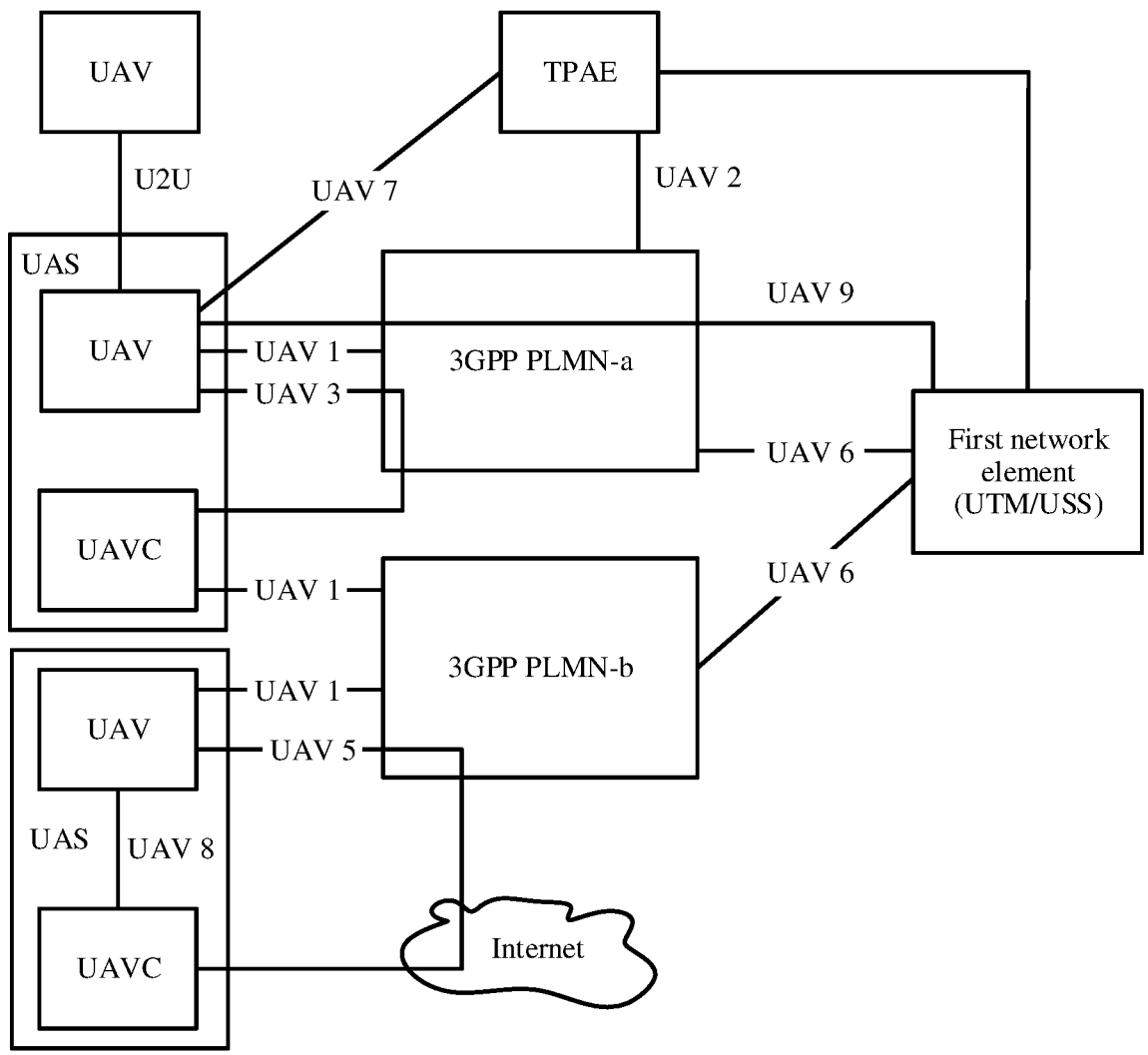
FIG. 2 is a schematic diagram of an architecture of an unmanned aerial system in a 3GPP system according to an embodiment of this application.

In addition, FIG. 2 is a schematic diagram of an architecture of an unmanned aerial system in a 3GPP system according to an embodiment of this application. It can be learned from FIG. 2 that a UAV and a UAVC may access a 3GPP network through a same public land mobile network (PLMN) or different public land mobile networks to establish communication, or may implement direct communication without using the 3GPP network. For example, a UAV 3 may access the 3GPP network through a PLMN-a and a PLMN-b, to implement communication with the UAVC: or the UAV may communicate with the UAVC using a non-3GPP communication technology instead of the 3GPP network, for example, in a manner such as Bluetooth, for example, a UAV 8 and the UAVC in FIG. 2. A processing method of an abnormally behaving unmanned aerial vehicle provided in embodiments of this application is mainly used in a scenario in which the UAV establishes the communication with the UAVC using the 3GPP network.

In addition, a third party authorized entity (TPAE) shown in FIG. 2 is a privileged controller, acts as a supervisor, and can directly obtain information about the UAV and information about the UAVC from the UAV: or may alternatively access the 3GPP network, and obtain information about the UAVC and information about the UAV from the 3GPP network. Alternatively, the TPAE apparatus may be connected to the UAV using the Internet, or may interact with the UAV after being authorized by a first network element. This is not specifically limited in this embodiment.

The first network element includes a series of functions, such as UAV authorization and authentication, and/or UAVC authorization and authentication, management of an unmanned aerial system (UAS) policy, and control of traffic corresponding to a UAV in the air. The first network element may be located outside the 3GPP network, and interacts with another network element, for example, the SMF network element or the AMF network element shown in FIG. 1, in the 3GPP network via a NEF network element. Alternatively, the first network element may be located inside the 3GPP network, and directly interacts with another network element in the 3GPP network, or functions may be distributed in an existing network element or another new network element. A specific existence form of the first network element is not specifically limited in this embodiment. It should be understood that the first network element shown in FIG. 2 may be a UTM network element, may be an unmanned aerial system service supplier (USS) network element, or may include a UTM network element and a USS network element. This is not specifically limited in this embodiment.

In addition, it should be understood that the UAV described in this embodiment is actually an unmanned aerial vehicle carrying the UE in FIG. 1, and the UAVC is actually an unmanned aerial vehicle controller carrying the UE.

The system architecture of the 5G network and the system architecture of the 3GPP network in the unmanned aerial system are described above. However, it may be understood that some network elements in the 5G network may correspond to network elements in the 4G network in terms of functions. For example, the SMF network element in the network architecture corresponding to FIG. 1 may correspond to a packet data network gateway control plane (PGW-C), a serving gateway control plane (SGW-C), or the like in the 4G network. The UPF network element in the network architecture corresponding to FIG. 1 may correspond to a packet data network gateway user plane (PGW-U), a serving gateway user plane (SGW-U), or the like in the 4G network. The PCF network element in the network architecture corresponding to FIG. 1 may correspond to a policy and charging rules function (PCRF) in the 4G network. The AMF network element in the network architecture corresponding to FIG. 1 may correspond to a mobility management entity (MME) in the 4G network. The NEF network element in the network architecture corresponding to FIG. 1 may also correspond to a service capability exposure unit (SCEF) in the 4G network. The DN in the network architecture corresponding to FIG. 1 corresponds to a packet data network (PDN) in the 4G network.

The following first describes a processing system of an abnormally behaving unmanned aerial vehicle and a processing method of an abnormally behaving unmanned aerial vehicle in this application from an overall perspective.

Figure 3:
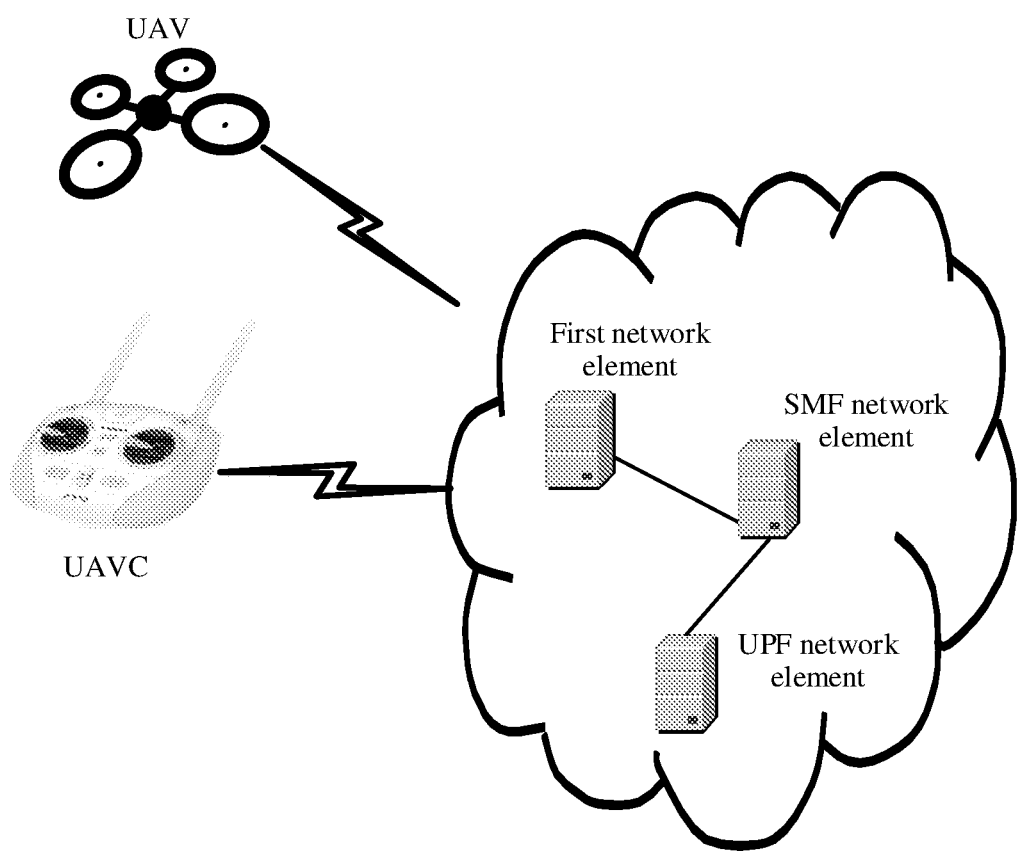
FIG. 3 is a schematic diagram of an embodiment of a processing system of an abnormally behaving unmanned aerial vehicle according to this application.

FIG. 3 is a schematic diagram of an embodiment of a processing system of an abnormally behaving unmanned aerial vehicle according to this application. As shown in FIG. 3, the processing system of an abnormally behaving unmanned aerial vehicle in this application may include an SMF network element, a UPF network element, a first network element, and a UAV or a UAVC. The UAV and the UAVC may establish communication by accessing a 3GPP network. The SMF network element and the first network element may also establish communication by accessing the 3GPP network, or directly establish communication. The UAV and the UAVC shown are paired, to be specific, flight control on the UAV may be implemented using the UAVC. C2 data may be transmitted between the UAV and the UAVC. The C2 data may be understood as command and control (C2) information that is related to a UAV operation and that is transmitted between the UAV and the UAVC, and include necessary information for controlling the UAV.

It should be noted that only one UAV and one UAVC for controlling the UAV are shown in FIG. 3. Actually, there may be two or more UAVs and UAVCs. This is not specifically limited in this application. The communication connection established between the UAV and the UAVC using the 3GPP network may be established in a manner of setting a mobile subscriber identity card in the UAV or setting a mobile subscriber identity card in the UAVC, for example, a subscriber identity card (SIM), a user identity card (UIM), or a global subscriber identity card (USIM).

Generally, for a UAV whose flight behavior is abnormal, if non-C2 data continues to be transmitted between the UAV and the UAVC in this case, that is, information not for controlling the UAV is transmitted, for example, information such as an image or a video generated by photographing a scene in a no-fly zone, a great threat is brought to public security. C2 data has two features: (1) The C2 data has a small data size: (2) Generally, the UAVC sends a control message to the UAV, and the UAV feeds back a corresponding message, where frequency is not high. Therefore, based on the features of the foregoing C2 data, the following separately describes a processing method of an abnormally behaving unmanned aerial vehicle in this application from a perspective of a user plane and a perspective of a control plane.

1. From the perspective of the user plane

Figure 4:
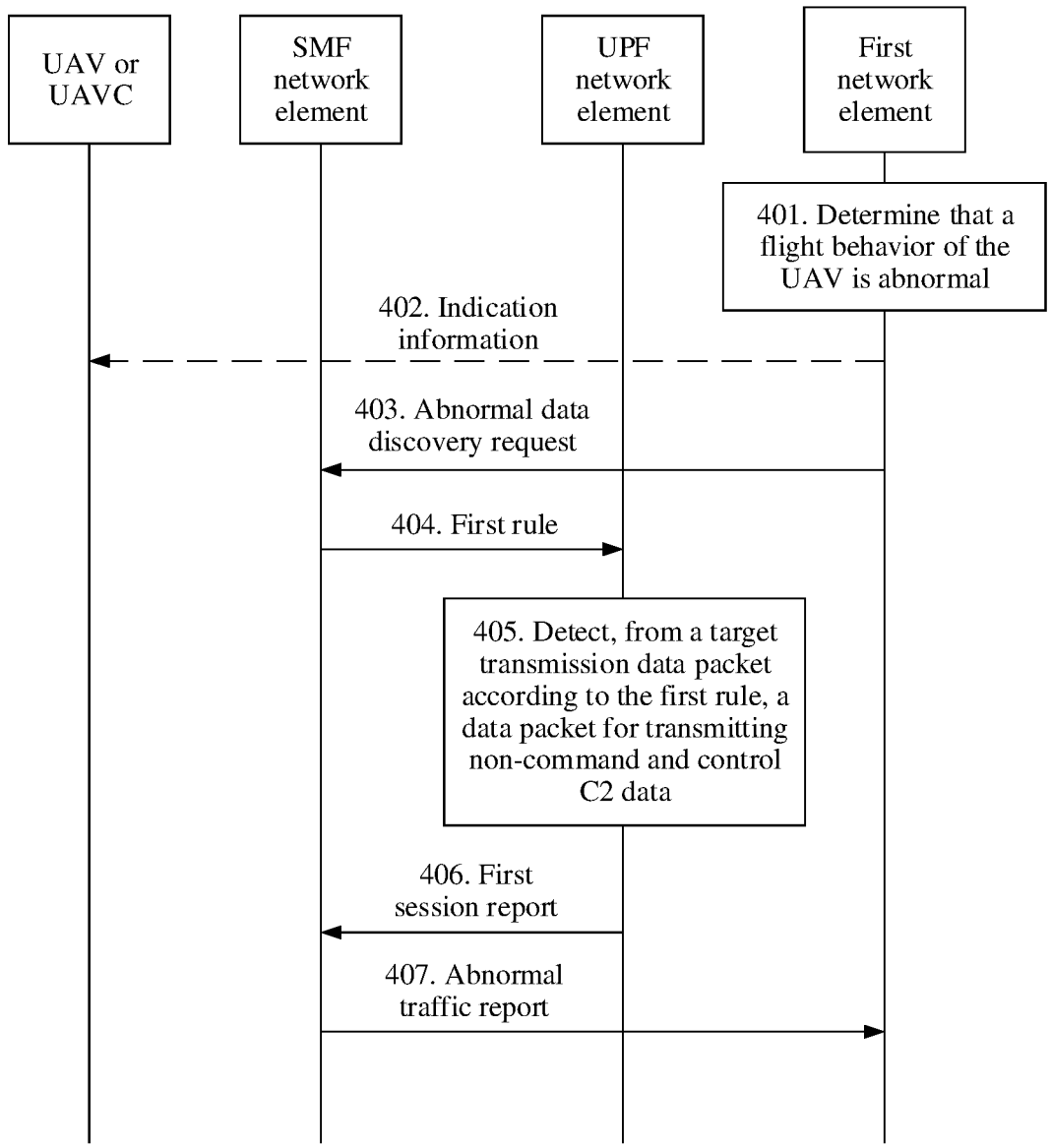
FIG. 4 is a schematic diagram of an embodiment of a processing method of an abnormally behaving unmanned aerial vehicle according to embodiments.

For better understanding of the solutions provided in embodiments of this application, the following describes a specific procedure in embodiments. FIG. 4 is a schematic diagram of an embodiment of a processing method of an abnormally behaving unmanned aerial vehicle according to embodiments. The method may include the following steps.

401. A first network element determines that a flight behavior of a UAV is abnormal.

In this embodiment, that the flight behavior of the UAV is abnormal may be understood as that the UAV enters a no-fly zone, approaches a no-fly zone, or the like during flight. For example, it is assumed that both a circular area having a radius of 800 meters and a peripheral radius of 20 meters of the circular area belong to the no-fly zone. If a distance between the UAV and the circular area in a flight process is less than or equal to 800 meters, it may be considered that the UAV enters the no-fly zone. In this case, it may be determined that the flight behavior of the UAV is abnormal. Alternatively, if the distance between the UAV and the circular area in the flight process is greater than 800 meters and less than 820 meters, it may be considered that the UAV approaches the no-fly zone. In this case, it may also be determined that the flight behavior of the UAV is abnormal. It should be noted that an area of the no-fly zone is merely an example for description. That the flight behavior of the UAV is abnormal should not be merely understood as that the UAV enters or approaches the no-fly zone. In actual application, that the flight behavior is abnormal may be caused in another scenario. This is not specifically limited in this embodiment.

It may be understood that the first network element determines, in a plurality of manners, that the flight behavior of the unmanned aerial vehicle (UAV) is abnormal. This is not specifically limited in this embodiment. For example, the first network element may receive a report about that the flight behavior of the UAV is abnormal from a core network element such as an SMF network element or a RAN, and then determine, based on the report, that the flight behavior of the UAV is abnormal. Alternatively, the UAV or a UAVC provides auxiliary information such as horizontal position information, vertical position information, or speed information of the UAV for the first network element, so that the first network element can detect the flight behavior of the UAV based on the auxiliary information such as the horizontal position information, the vertical position information, or the speed information of the UAV after obtaining the auxiliary information such as the horizontal position information, the vertical position information, or the speed information of the UAV. Alternatively, a core network element such as an SMF network element or a RAN may provide the foregoing auxiliary information or the like for the first network element. This is not specifically limited in this embodiment.

Optionally, the method further includes step 402.

402. The first network element sends indication information to the UAV or the UAVC.

In this embodiment, the indication information may indicate the UAV to stop transmitting non-C2 data to the UAVC, or indicate the UAVC to stop transmitting the non-C2 data to the UAV, for example, stop transmitting the non-C2 data using a 3GPP network, to implement pre-notification.

In addition, in some embodiments, if the indication information further includes a specified area, after the UAV or the UAVC receives the indication information, the indication information indicates the UAV to fly to or indicates the UAVC to fly the UAV to the specified area, so that abnormality detection is to be performed on the UAV. Certainly, if the indication information further includes specified time, after the UAV or the UAVC receives the indication information, the indication information indicates the UAV or the UAVC to adjust, within the specified time, the flight behavior of the UAV from an abnormal state to a normal state, for example, exiting the no-fly zone or moving away from the no-fly zone.

In addition, in some other embodiments, the first network element may send the indication information to the UAV or the UAVC in a plurality of manners. For example, if the UAV or the UAVC is connected to the first network element through a user plane, the first network element may send the indication information to the UAV or the UAVC via a user plane network element such as a UPF network element or a (R)AN: or the first network element sends the indication information to the UAV or the UAVC via a control plane network element. For example, (1) the first network element directly sends the indication information to the UAV or the UAVC, in other words, an SMF network element, a PCF network element, and an AMF network element are only responsible for transparently transmitting the indication information: (2) the first network element indirectly sends the indication information to the UAV/UAVC, to be specific, the first network element sends the indication information to the PCF network element, the PCF network element derives policy information based on the indication information and sends the policy information to the AMF network element, and the AMF network element indicates, through a configuration update procedure, the UAV or the UAVC to stop transmitting the non-C2 data. It may be understood that a manner of sending the indication information is not limited in this embodiment.

It should be noted that in an actual application process, step 402 may be performed before the following step 403, or step 402 may not be performed. This is not specifically limited in this embodiment.

403. The first network element sends an abnormal data detection request to the SMF network element.

In this embodiment, the abnormal data detection request includes but is not limited to parameters such as a threshold of a size of a single data packet, a threshold of a ratio of a quantity of uplink data packets to a quantity of downlink data packets, and a threshold of a transmission rate of the uplink/downlink data packet. These parameters may be used as detection indicators for detecting a data packet for transmitting the non-C2 data.

Therefore, when determining that the flight behavior of the UAV is abnormal, the first network element may send the abnormal data detection request to the SMF network element, so that the SMF network element can parse the parameter carried in the abnormal data detection request, to determine a first rule based on the parsed parameter.

In addition, it may be understood that the first network element may send the abnormal data detection request to the SMF network element in a plurality of manners. For example, the first network element directly sends the abnormal data detection request to the SMF network element, in other words, the PCF network element is only responsible for transparently transmitting the abnormal data detection request: or the first network element indirectly sends the abnormal data detection request to the SMF network element, to be specific, the first network element sends the abnormal data detection request to the PCF network element, and the PCF network element derives policy information based on the abnormal data detection request and sends the policy information to the SMF network element. The PCF network element herein is merely an example, and may be another network element. This is not specifically limited in this embodiment. It may be understood that a manner of sending the abnormal data detection request is not limited in this embodiment of this application.

In addition, the abnormal data detection request may be an existing message type, an existing information element, a new message type, a new information element, or another possible message form. An existence form of the abnormal data detection request is not limited in this embodiment of this application.

In addition, the abnormal data detection request is merely for notifying the SMF network element that the flight behavior of the UAV is abnormal. A specific name may be replaced with another name in actual application, for example, an abnormal data discovery request. This is not limited in this embodiment of this application.

In addition, it should be further noted that the threshold of the size of the single data packet described above refers to a maximum value of a size of a data packet corresponding to C2 data, and is determined by the first network element based on features of the C2 data. In this embodiment, how the first network element determines, based on the features of the C2 data, the threshold of the size of the single data packet and a value of the threshold of the size of the single data packet is not limited.

The described threshold of the ratio of the quantity of uplink data packets to the quantity of downlink data packets refers to a ratio of a quantity of data packets sent by the UAV to the UAVC to a quantity of data packets sent by the UAVC to the UAV (when UE is the UAV), or a ratio of a quantity of data packets sent by the UAVC to the UAV to a quantity of data packets sent by the UAV to the UAVC (when the UE is the UAVC), and is determined by the first network element based on the features of the C2 data. In addition, the threshold of the ratio of the quantity of uplink data packets to the quantity of downlink data packets may be a fixed threshold, or may be a ratio range. However, in this embodiment, how the first network element determines, based on the features of the C2 data, the threshold of the ratio of the quantity of uplink data packets to the quantity of downlink data packets and a specific value of the threshold of the ratio of the quantity of uplink data packets to the quantity of downlink data packets, and a specific representation form are not limited.

The described threshold of the transmission rate of the uplink/downlink data packet refers to a threshold of the quantity of uplink data packets per unit time and a threshold of the quantity of downlink data packets per unit time, and is determined by the first network element based on the features of the C2 data. However, in this embodiment, how the first network element determines, based on the features of the C2 data, the threshold of the transmission rate of the uplink/downlink data packet and a specific value of the threshold of the transmission rate of the uplink/downlink data packet is not limited.

Optionally, in some other embodiments, the abnormal data detection request may include one or more of identification information of the UAV, identification information of the UAVC, identification information of a UAS, and a session identifier, and the session identifier indicates a session for data transmission between the UAV and the UAVC.

In this embodiment, to limit a data packet detection range, the first network element may send one of the identification information of the UAV and the identification information of the UAVC to the SMF network element using the abnormal data detection request. In this way, the SMF network element may limit, based on the identification information of the UAV, the detection range to UE corresponding to the identification information of the UAV, where the UE is a destination side or a source side: the SMF network element may limit, based on the identification information of the UAVC, the detection range to UE corresponding to the identification information of the UAVC, where the UE is a destination side or a source side: or the SMF network element may limit, based on the identification information of the UAS including the UAV and the UAVC, the detection range to UE corresponding to the identification information of the UAS, where the UE is a destination side or a source side.

Alternatively, to further limit the data packet detection range, the first network element may alternatively send identification information on the other side to the SMF network element. For example, if current UE is the UAV, the other side refers to the UAVC. In this way, the SMF network element may further limit, based on the identification information of the UAV and the identification information of the UAVC, the detection range to a data packet whose source side is the UAV and whose destination side is the UAVC, or further limit the detection range to a data packet whose source side is the UAVC and whose destination side is the UAV. It may be understood that when the UAV establishes a user plane connection to only one UAVC, the first network element may not provide the identification information on the other side. In this way, the SMF network element may determine a data packet on a source side or a destination side based on identification information on one side, and the determined data packet on the source side or the destination side is a data packet on the destination side or the source side corresponding to the other side.

In addition, the SMF network element may alternatively combine the identification information of the UAV, the identification information of the UAVC, the identification information of the UAS, and the session identifier, to limit the detection range to a data packet that is transmitted using a session corresponding to the session identifier and whose destination side or source side is UE corresponding to the identifier. It may be understood that, to communicate with each other, the UAV and the UAVC may need to separately establish different sessions. In this case, the SMF network element may determine a corresponding session based on single-side or dual-side session identification information.

It should be noted that the SMF network element may determine the session identifier based on the identification information of the UAV, the identification information of the UAVC, and the identification information of the UAS that are sent by the first network element: or after the PCF network element determines the session identifier after receiving the identification information of the UAV, the identification information of the UAVC, and the identification information of the UAS that are sent by the first network element, the PCF network element sends the session identifier to the SMF network element. A specific manner of determining the session identifier is not limited in this embodiment of this application.

In addition, the identification information of the UAV and the identification information of the UAVC are not limited in this embodiment. For example, the identification information of the UAV and the identification information of the UAVC may be identification information that is located outside the 3GPP network and that is allocated by another network element to the UAV or the UAVC. In this way, after receiving the identification information of the UAV or the identification information of the UAVC, the core network element such as the PCF network element directly uses the identification information of the UAV or the identification information of the UAVC or converts the identification information of the UAV or the identification information of the UAVC into identification information in the 3GPP network, for example, an identifier allocated by the 3GPP network to the UAV or the UAVC, and an identifier corresponding to a USIM card in the UAV or the UAVC.

Alternatively, the identification information of the UAV and the identification information of the UAVC are identifiers respectively allocated by the 3GPP network to the UAV and the UAVC. In this way, after receiving the identification information of the UAV and the identification information of the UAVC, the core network element such as the PCF network element directly uses the identification information of the UAV or the identification information of the UAVC or converts the identification information of the UAV and the identification information of the UAVC into identifiers corresponding to USIM cards in the UAV and the UAVC respectively. Alternatively, the identification information of the UAV and the identification information of the UAVC may form the identification information of the UAS including the UAV and the UAVC.

Optionally, in some other embodiments, the abnormal data detection request may further include address information of the UAV or address information of the UAVC. In this way, the SMF network element may further limit, based on the address information of the UAV and the address information of the UAVC, the detection range to the data packet whose source side is the UAV and whose destination side is the UAVC, or further limit the detection range to the data packet whose source side is the UAVC and whose destination side is the UAV.

It should be noted that the address information of the UAV or the address information of the UAVC is not limited in this embodiment. For example, an address of the UAV or an address of the UAVC may be an internet protocol version 4 (Ipv4) address, an internet protocol version 6 (Ipv6) address, a media access control (MAC) address, or another possible address form. The corresponding address information may further include a type of the address, for example, Ipv4, Ipv6, or Ethernet. This is not specifically limited in this embodiment.

404. The SMF network element provides the first rule for the user plane function (UPF) network element.

In this embodiment, the first rule indicates the UPF network element to detect, from a target transmission data packet, the data packet for transmitting the non-C2 data, and the target transmission data packet is a data packet transmitted between the UAV and the UAVC.

It should be noted that the SMF network element may directly provide the first rule for the UPF network element, or may store the first rule in another network element or another apparatus, and the UPF network element obtains the first rule from the another network element or the another apparatus, or may include the first rule in a session update request or another type of message, and provide the first rule for the UPF network element by sending the session update request message or the another type of message. In this embodiment, a manner in which the SMF network element provides the first rule for the UPF network element is not specifically limited.

Optionally, in some embodiments, that the SMF network element provides the first rule for the UPF network element includes: The SMF network element provides the first rule for the UPF network element based on the abnormal data detection request.

In other words, the SMF network element may provide the first rule for the UPF network element as triggered by the abnormal data detection request, so that the UPF network element detects, according to the first rule, the data packet for transmitting the non-C2 data.

Optionally, in some other embodiments, when providing the first rule for the UPF network element, the SMF network element also synchronously provides a detection duration for the UPF network element, so that the detection duration may indicate the UPF network element to perform step 406 within the detection duration, to be specific, indicate the UPF network element to detect, within the detection duration from the target transmission data packet according to the first rule, the data packet for transmitting the non-C2 data. In other words, when the first rule does not include the detection duration, after receiving the detection duration, the UPF network element starts a timer based on a local configuration, to perform step 406 within the detection duration.

In some other optional embodiments, it should be further understood that the first rule may also include the detection duration. In this way, after providing the first rule for the UPF network element, the SMF network element may also synchronize the detection duration to the UPF network element.

It should be noted that the detection duration may be preset by a user, and a specific value of the detection duration is not limited in this embodiment.

405. The UPF network element detects, from the target transmission data packet according to the first rule, the data packet for transmitting the non-command and control (non-C2) data.

In this embodiment, after obtaining the first rule sent by the SMF network element, the UPF network element may detect, from the target transmission data packet according to the first rule, the data packet for transmitting the non-command and control (non-C2) data.

Optionally, the first rule includes one or more of the threshold of the size of the single data packet, the threshold of the ratio of the quantity of uplink data packets to the quantity of downlink data packets, and the threshold of the transmission rate of the uplink/downlink data packet.

In this case, after obtaining the first rule, the UPF network element may obtain one or more of the threshold of the size of the single data packet, the threshold of the ratio of the quantity of uplink data packets to the quantity of downlink data packets, and the threshold of the transmission rate of the uplink/downlink data packet. In this way, the UPF network element may detect the target transmission data packet based on one or more of the threshold of the size of the single data packet, the threshold of the ratio of the quantity of uplink data packets to the quantity of downlink data packets, and the threshold of the transmission rate of the uplink/downlink data packet, to detect the data packet for transmitting the non-C2 data packet.

Specifically, for a detection manner in which the UPF network element detects, from the target transmission data packet according to the first rule, the data packet for transmitting the non-C2 data, refer to the following descriptions for understanding.

(1) The UPF network element may compare a data packet size of the target transmission data packet with the threshold of the size of the single data packet. When the data packet size of the target transmission data packet is greater than the threshold of the size of the single data packet, it means that the target transmission data packet may be not for transmitting the C2 data. Therefore, the UPF network element may determine, as the data packet for transmitting the non-C2 data, a target transmission data packet whose data packet size is greater than the threshold of the size of the single data packet.

In addition, the UPF network element may further determine, when the data packet size of the target transmission data packet is greater than the threshold of the size of the single data packet that is in the first rule, that an abnormal characteristic is abnormality of the data packet size.

(2) Alternatively, the UPF network element may first determine the quantity of uplink data packets and the quantity of downlink data packets from the target transmission data packet, and then calculate the ratio of the quantity of uplink data packets to the quantity of downlink data packets based on the quantity of uplink data packets and the quantity of downlink data packets. In this way, the UPF network element may compare the ratio of the quantity of uplink data packets to the quantity of downlink data packets with the threshold of the ratio of the quantity of uplink data packets to the quantity of downlink data packets. When the ratio of the quantity of uplink data packets to the quantity of downlink data packets is not equal to the threshold of the ratio of the quantity of uplink data packets to the quantity of downlink data packets, the UPF network element may determine that the uplink/downlink data packet may include the non-C2 data. Alternatively, when the threshold of the ratio of the quantity of uplink data packets to the quantity of downlink data packets corresponds to a range, the UPF network element may compare the ratio of the quantity of uplink data packets to the quantity of downlink data packets with the range corresponding to the threshold of the ratio of the quantity of uplink data packets to the quantity of downlink data packets. When determining that the ratio of the quantity of uplink data packets to the quantity of downlink data packets does not fall within the range corresponding to the threshold of the ratio of the quantity of uplink data packets to the quantity of downlink data packets, the UPF network element may also determine that the uplink/downlink data packets may include the non-C2 data.

Therefore, the UPF network element may determine one or more uplink data packets or downlink data packets as the data packet for transmitting the non-C2 data, where a ratio of a quantity of the uplink data packets to a quantity of the downlink data packets is not equal to the threshold of the ratio of the quantity of uplink data packets to the quantity of downlink data packets or does not fall within the range corresponding to the threshold of the ratio of the quantity of uplink data packets to the quantity of downlink data packets.

In addition, the UPF network element may further determine, when the ratio of the quantity of uplink data packets to the quantity of downlink data packets is not equal to the threshold of the ratio of the quantity of uplink data packets to the quantity of downlink data packets or does not fall within the range corresponding to the threshold of the ratio of the quantity of uplink data packets to the quantity of downlink data packets, that the abnormal characteristic is abnormality of the ratio of the quantity of uplink data packets to the quantity of downlink data packets.

For example, it is assumed that the threshold of the ratio of the quantity of uplink data packets to the quantity of downlink data packets is a fixed value "1". If the UE is the UAV, the UAVC sends a steering control message included in a downlink data packet to the UAV, and the UAV responds to the UAVC with a steering feedback message included in an uplink data packet. In this case, if a ratio of a quantity of data packets sent by the UAV to the UAVC to a quantity of data packets sent by the UAVC to the UAV is greater than 1, the UPF network element may determine that the data packets sent by the UAV to the UAVC may include the non-C2 data.

In addition, it may alternatively be assumed that the range corresponding to the threshold of the ratio of the quantity of uplink data packets to the quantity of downlink data packets is "[1,3]". If the UE is the UAV, the UAVC sends a steering control message included in a downlink data packet to the UAV, and the UAV responds to the UAVC with one to three steering feedback messages included in one to three uplink data packets. In this case, usually, because the quantity of data packets sent by the UAV to the UAVC and the quantity of data packets sent by the UAVC to the UAV are greater than 3, the ratio of the quantity of uplink data packets to the quantity of downlink data packets does not fall within [1, 3]. In this case, the UPF network element may determine that the data packets sent by the UAV to the UAVC may include the non-C2 data.

It should be understood that the foregoing described fixed value "1" and range "[1, 3]" are merely examples for description, and are not specifically limited in this embodiment.

(3) Alternatively, the UPF network element may first determine the quantity of uplink data packets and the quantity of downlink data packets per unit time from the target transmission data packet, and then calculate the transmission rate of the uplink/downlink data packet based on the quantity of uplink data packets and the quantity of downlink data packets per unit time. In this way, the UPF network element may compare the transmission rate of the uplink/downlink data packet with the threshold of the transmission rate of the uplink/downlink data packet. When the transmission rate of the uplink/downlink data packet is greater than the threshold of the transmission rate of the uplink/downlink data packet, the UPF network element may determine that the uplink/downlink data packet may include the non-C2 data. Therefore, the UPF network element may determine an uplink data packet or a downlink data packet as the data packet for transmitting the non-C2 data, where a transmission rate of the uplink data packet or the downlink data packet is greater than the threshold of the transmission rate of the uplink/downlink data packet.

In addition, when the transmission rate of the uplink/downlink data packet is greater than the threshold of the transmission rate of the uplink/downlink data packet, the UPF network element may further determine that the abnormal characteristic is abnormality of the transmission rate of the uplink/downlink data packet.

It should be understood that one or more of (1), (2), and (3) may be performed. This is not limited in this embodiment.

406. The UPF network element sends a first session report to the SMF network element.

In this embodiment, after detecting, according to the first rule, the data packet for transmitting the non-C2 data, the UPF network element generates the first session report. In this way, the UPF network element may send the first session report to the SMF network element, so that the SMF network element can learn, from the first session report, that the data packet for transmitting the non-C2 data is detected in the target transmission data packet.

It should be noted that the first session report may be an existing message type, an existing information element, a new message type, a new information element, or another possible message form. An existence form of the first session report is not limited in this embodiment.

407. The SMF network element sends an abnormal traffic report to the first network element based on the first session report.

In this embodiment, as triggered by the first session report, the SMF network element sends the abnormal traffic report to the first network element. It may be understood that the abnormal traffic report includes one or more of the identification information of the UAV, the identification information of the UAVC, and the identification information of the unmanned aerial system (UAS) including the UAV and the UAVC.

Optionally, in some embodiments, the abnormal traffic report may further include the abnormal characteristic, and the abnormal characteristic may include one or more of the abnormality of the data packet size, the abnormality of the ratio of the quantity of uplink data packets to the quantity of downlink data packets, and the abnormality of the transmission rate of the uplink/downlink data packet.

Optionally, in some other embodiments, the first network element may further provide a data packet processing policy for the SMF network element, so that the SMF network element can provide a second rule for the UPF network element according to the data packet processing policy.

In this way, after obtaining the second rule, the UPF network element may process a data packet according to the second rule, including processing the data packet for transmitting the non-C2 data and a data packet for transmitting the C2 data. In addition, the second rule may include one or more of packet discarding, cache, and forwarding, where the forwarding refers to forwarding the data packet to the first network element or a first apparatus.

It may be understood that, if the abnormal traffic report includes the abnormal characteristic, and the abnormal characteristic indicates the abnormality of the data packet size, the second rule provided by the SMF network element may enable the UPF network element to forward a data packet whose size is abnormal to the first network element or the first apparatus, and normally forward the data packet for transmitting the C2 data to the UAV or the UAVC, or no longer normally forward the data packet for transmitting the C2 data to the UAV or the UAVC.

Alternatively, if the abnormal traffic report does not include the abnormal characteristic, the second rule provided by the SMF network element may enable the UPF network element to forward, to the first network element or the first apparatus, a data packet transmitted between the UAV and the UAVC. To be specific, regardless of whether the data packet transmitted between the UAV and the UAVC is the data packet for transmitting the non-C2 data or the data packet for transmitting the C2 data, the UPF network element may forward the data packet transmitted between the UAV and the UAVC to the first network element or the first apparatus, so that data transmission between the UAV and the UAVC can continue, or data transmission between the UAV and the UAVC is no longer allowed.

It may be understood that the first apparatus may be a TAPE controller, or another authorized third-party entity such as a controller or an apparatus that can be configured to control the UAV. This is not specifically limited in this embodiment. In addition, that the first network element provides the data packet processing policy for the SMF network element may be performed synchronously with step 403. To be specific, in step 403, in addition to sending the abnormal data detection request to the SMF network element, the first network element may further provide the data packet processing policy for the SMF network element. That the SMF network element provides the second rule for the UPF network element based on the data packet processing policy may be performed synchronously with step 404. To be specific, in step 404, in addition to providing the first rule for the UPF network element, the SMF network element may further provide the second rule for the UPF network element.

Optionally, in some other embodiments, after receiving the abnormal traffic report, the first network element may further send an indication to the SMF network element, to trigger the SMF network element to release a session for communication between the UAV and the UAVC, that is, disconnect the UAVC from the UAV. Certainly, the first network element may further execute another possible measure, for example, notify, from a signaling plane, an application plane that traffic corresponding to the data packet for transmitting the non-C2 data is abnormal, so that the application plane indicates a law enforcement authority to execute a compulsory measure.

For integrity of the solutions, after the UPF network element or the first network element processes the data packet for transmitting the non-C2 data, if the first network element has detected that the flight behavior of the UAV is in the normal state, the first network element may further send an indication to the UAV or the UAVC, so that the UAV or the UAVC cancels limitation on transmission of the non-C2 data after receiving the indication. In addition, the first network element further needs to send a cancelation request to the SMF network element. After receiving the cancelation request, the SMF network element sends a rule cancelation request to the UPF network element, so that the UPF network element no longer performs non-C2 data detection, based on the rule cancelation request, on the data packet transmitted between the UAV and the UAVC.

In this embodiment, the UPF network element not only detects, according to the first rule, the data packet for transmitting the non-C2 data, but also feeds back the first session report to the SMF network element, so that the SMF network element sends the abnormal traffic report to the first network element based on the first session report. In this way, the first network element having a supervision function can process, based on the abnormal traffic report, the data packet for transmitting the non-C2 data. This not only implements detection on the data packet for transmitting the non-C2 data, but also prevents, through processing by the first network element having the supervision function on the data packet for transmitting the non-C2 data, the data packet for transmitting the non-C2 data from being transmitted to the UAVC or the UAV. In addition, the UAVC is not disconnected from the UAV or the controller is not switched to control the UAV, and the UAVC can continue to be used to control the UAV. This ensures transmission of the C2 data and thus maintains control stability. In addition, pressure on the first network element to synchronously process the non-C2 data and the C2 data is reduced.

Figure 5:
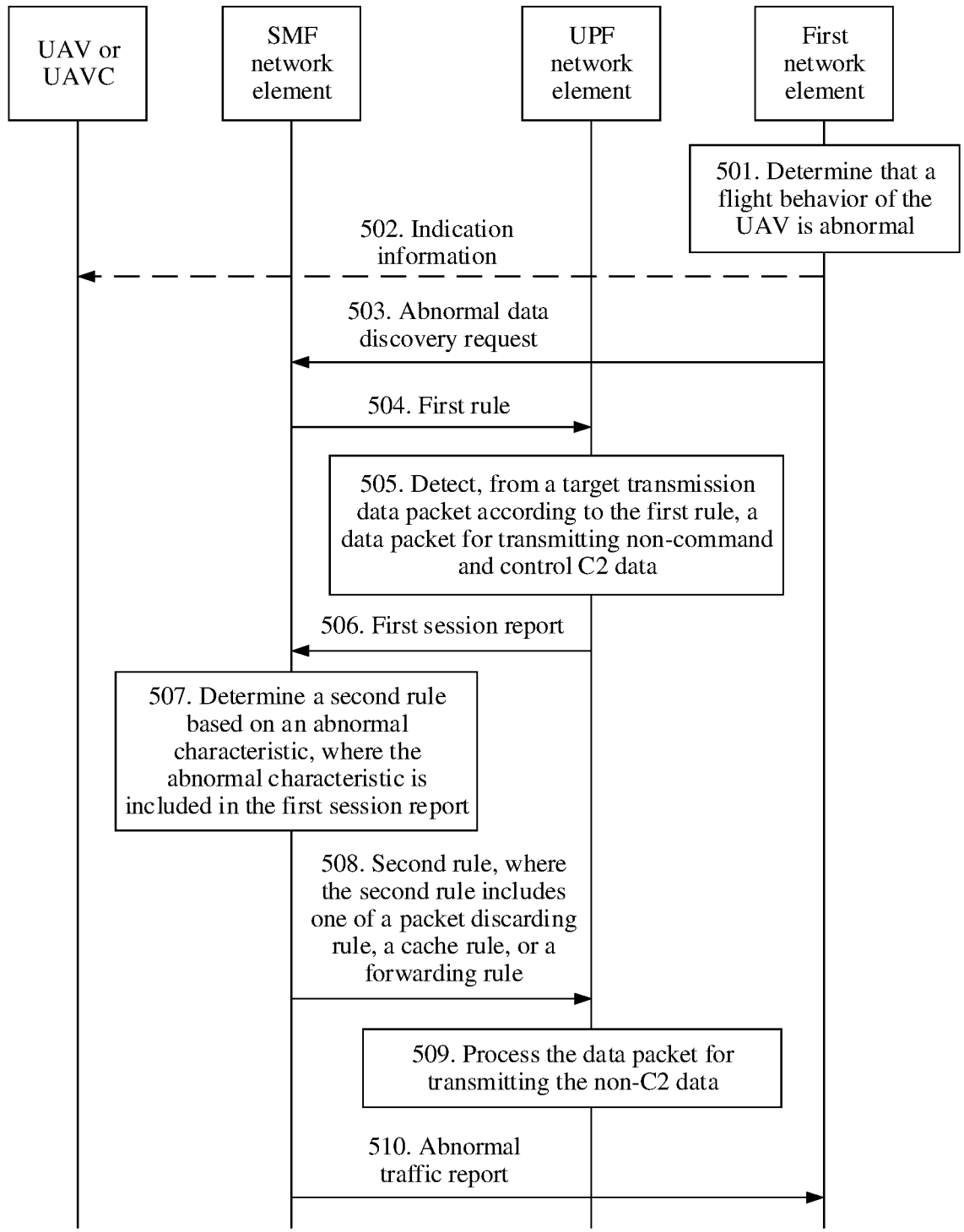
FIG. 5 is a schematic diagram of another embodiment of a processing method of an abnormally behaving unmanned aerial vehicle according to embodiments.

The foregoing mainly provides descriptions from a perspective of processing the abnormally behaving unmanned aerial vehicle by the first network element. The following provides descriptions from a perspective of processing the abnormally behaving unmanned aerial vehicle by a UPF network element. FIG. 5 is a schematic diagram of another embodiment of a processing method of an abnormally behaving unmanned aerial vehicle according to embodiments of this application. The method may include the following steps.

501. A first network element determines that a flight behavior of a UAV is abnormal.

502. The first network element sends indication information to the UAV or a UAVC.

503. The first network element sends an abnormal data detection request to an SMF network element.

504. The SMF network element provides a first rule for a user plane function (UPF) network element.

505. The UPF network element detects, from the target transmission data packet according to the first rule, a data packet for transmitting non-command and control (non-C2) data.

506. The UPF network element sends a first session report to the SMF network element.

In this embodiment, steps 501 to 506 may be understood with reference to steps 401 to 406 in FIG. 4. This is not specifically limited herein.

507. The SMF network element determines a second rule based on an abnormal characteristic, where the abnormal characteristic is included in the first session report.

In this embodiment, the first session report may further include the abnormal characteristic of the data packet for transmitting the non-C2 data, for example, one or more of the abnormality of the data packet size, the abnormality of the ratio of the quantity of uplink data packets to the quantity of downlink data packets, and the abnormality of the transmission rate of the uplink/downlink data packet described in step 405.

After obtaining the abnormal characteristic, the SMF network element may determine the corresponding second rule based on the abnormal characteristic. To be specific, the second rule is a rule indicating to process the data packet for transmitting the non-C2 data. The second rule may include one of a packet discarding rule, a cache rule, or a forwarding rule, and the forwarding rule may indicate to forward, to the first network element or a first apparatus, the data packet for transmitting the non-C2 data.

Specifically, different second rules are configured for different abnormal characteristics. For understanding, refer to descriptions of the following scenarios.

(1) If the abnormal characteristic is the abnormality of the data packet size, the SMF network element may determine one of the packet discarding rule or the cache rule. To be specific, the packet discarding rule or the cache rule respectively indicates the UPF network element to discard or cache the data packet for transmitting the non-C2 data in a case of the abnormality of the data packet size, so that the non-C2 data cannot be transmitted to the UAV or the UAVC, and normally send, to the UAV or the UAVC, a data packet for transmitting C2 data, so that the C2 data can still be used to control the UAV, to avoid out-of-control of the UAV.

(2) If the abnormal characteristic is one or more of the abnormality of the data packet size, the abnormality of the ratio of the quantity of uplink data packets to the quantity of downlink data packets, and the abnormality of the transmission rate of the uplink/downlink data packet, the SMF network element may determine one of the packet discarding rule or the cache rule. The packet discarding rule in this case indicates the UPF network element to discard, since an abnormal data packet is detected, all data packets that satisfy a data packet detection rule (PDR), so that the non-C2 data cannot be transmitted to the UAV or the UAVC. The cache rule in this case indicates the UPF network element to cache, since the abnormal data packet is detected, all the data packets that satisfy the PDR, so that the non-C2 data cannot be transmitted to the UAV or the UAVC, and normally send, to the UAV or the UAVC, the data packet for transmitting the C2 data.

(3) If the abnormal characteristic is the abnormality of the data packet size, the SMF network element may determine the forwarding rule. To be specific, the forwarding rule in this case indicates the UPF network element to forward, to the first network element or the first apparatus, the data packet for transmitting the non-C2 data in the case of the abnormality of the data packet size, so that the non-C2 data cannot be transmitted to the UAV or the UAVC, and normally send, to the UAV or the UAVC, the data packet for transmitting the C2 data, so that the C2 data can still be used to control the UAV, to avoid out-of-control of the UAV.

(4) If the abnormal characteristic is one or more of the abnormality of the data packet size, the abnormality of the ratio of the quantity of uplink data packets to the quantity of downlink data packets, and the abnormality of the transmission rate of the uplink/downlink data packet, the SMF network element may determine the forwarding rule. The forwarding rule in this case indicates the UPF network element to forward, since the abnormal data packet is detected, all the data packets that satisfy the PDR and that are detected to the first network element or the first apparatus, so that the non-C2 data cannot be transmitted to the UAV or the UAVC, and normally send, to the UAV or the UAVC, the data packet for transmitting the C2 data.

(5) If the abnormal characteristic is one or more of the abnormality of the data packet size, the abnormality of the ratio of the quantity of uplink data packets to the quantity of downlink data packets, and the abnormality of the transmission rate of the uplink/downlink data packet, the SMF network element may further determine the forwarding rule. The forwarding rule in this case indicates the UPF network element to forward, since the abnormal data packet is detected, all the data packets that satisfy the PDR and that are detected to the first network element or the first apparatus, and no longer normally send, to the UAV or the UAVC, the data packet for transmitting the C2 data.

It should be noted that, for the data packet satisfying the PDR in the scenarios (3) and (4), there are actually two forwarding rules. To be specific, if the forwarding rule is updated or unchanged, the data packet for transmitting the C2 data is forwarded to the UAV or the UAVC, and if a new forwarding rule is added, the data packet for transmitting the non-C2 data is forwarded to the first network element or the first apparatus.

In addition, in the scenario (4), the UPF network element needs to replicate the data packet for transmitting the non-C2 data and the data packet for transmitting the C2 data, and after receiving the corresponding forwarding rule, respectively forward, to the UAV or the UAVC and the first network element or the first apparatus based on an indication of the forwarding rule, the data packet for transmitting the non-C2 data and the data packet for transmitting the C2 data.

For the scenario (5), the SMF network element updates the forwarding rule, so that all the data packets satisfying the PDR are forwarded to the first network element or the first apparatus. This is equivalent to that a controller configured to control the UAV is switched from the UAVC to the first network element or the first apparatus, so that the UAV is no longer controlled by the original UAVC subsequently.

It may be understood that the first apparatus may be a TAPE controller, or another authorized third-party entity such as a controller or an apparatus that can be configured to control the UAV. This is not specifically limited in this embodiment.

508. The SMF network element sends the second rule to the UPF network element.

In this embodiment, after determining the second rule based on the abnormal characteristic, the SMF network element may send the second rule to the UPF network element. It should be noted that the second rule includes one of the packet discarding rule, the cache rule, or the forwarding rule, and the forwarding rule is used to forward, to the first network element or the first apparatus, the data packet for transmitting the non-C2 data.

509. The UPF network element processes, according to one of the packet discarding rule, the cache rule, or the forwarding rule, the data packet for transmitting the non-C2 data.

In this embodiment, after receiving the second rule, the UPF network element may obtain the packet discarding rule, the cache rule, or the forwarding rule through parsing, and then when detecting the abnormal data packet for transmitting the non-C2 data, the UPF network element may process, according to one of the packet discarding rule, the cache rule, or the forwarding rule, the data packet for transmitting the non-C2 data. For a specific processing process, refer to the scenarios described in step 508. Details are not described herein again.

510. The SMF network element sends an abnormal traffic report to the first network element based on the first session report.

In this embodiment, step 510 may be understood with reference to step 407. Details are not described herein again.

It should be noted that an execution sequence of steps 507 to 509 and step 510 is not limited. In actual application, step 510 may be performed first, and then steps 507 to 509 are performed.

In this embodiment, the UPF network element not only detects, according to the first rule, the data packet for transmitting the non-C2 data, but also feeds back the first session report to the SMF network element, so that the SMF network element sends the abnormal traffic report to the first network element based on the first session report. In this way, the first network element having a supervision function can process, based on the abnormal traffic report, the data packet for transmitting the non-C2 data. The SMF network element may further send the second rule to the UPF network element based on the abnormal characteristic in the first session report. Therefore, the UPF network element can also process, according to the second rule, the data packet for transmitting the non-C2 data. In this embodiment, the data packet for transmitting the non-C2 data is detected, and the first network element or the UPF network element processes the data packet for transmitting the non-C2 data. This prevents the data packet for transmitting the non-C2 data from being transmitted to the UAVC or the UAV. In addition, the UAVC is not disconnected from the UAV or the controller is not switched to control the UAV, and the UAVC can continue to be used to control the UAV. This ensures transmission of the C2 data and thus maintains control stability.

2. From the perspective of the control plane

Figure 6:
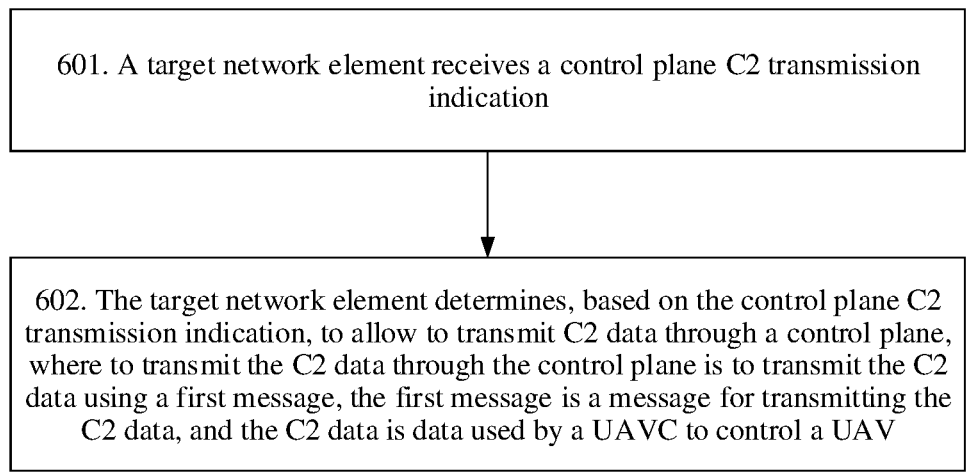
FIG. 6 is a schematic diagram of another embodiment of a processing method of an abnormally behaving unmanned aerial vehicle according to embodiments.

FIG. 4 and FIG. 5 mainly describe the processing method of the abnormally behaving unmanned aerial vehicle from the perspective of the user plane. Based on the features of the C2 data, this application further describes the processing method of the abnormally behaving unmanned aerial vehicle from the perspective of the control plane. FIG. 6 is a schematic diagram of another embodiment of a processing method of an abnormally behaving unmanned aerial vehicle according to embodiments of this application. The method may include the following steps.

601. A target network element receives a control plane C2 transmission indication.

In this embodiment, the control plane C2 transmission indication can indicate the target network element to perform negotiation on whether to allow to transmit C2 data through a control plane, to be specific, can indicate the target network element to change a transmission path for transmitting the C2 data from a user plane to the control plane. Due to features such as a data size of the C2 data, the control plane mainly for sending and receiving signaling can also use a specific message to transmit the C2 data. However, generally, a data packet of non-C2 data is large, and the specific message cannot include the data packet of the non-C2 data. This prevents the non-C2 data from being transmitted through the control plane.

It may be understood that the target network element receives the control plane C2 transmission indication in a plurality of manners. For example, the control plane C2 transmission indication may be sent by a first network element, or may be sent by a UAV or a UAVC. For a specific implementation process, refer to subsequent FIG. 7, FIG. 8, and FIG. 9A and FIG. 9B for understanding. Details are not described herein. In addition, in actual application, there may be another receiving manner. This is not limited in this embodiment.

602. The target network element determines, based on the control plane C2 transmission indication, to allow to transmit the C2 data through the control plane. To transmit the C2 data through the control plane is to transmit the C2 data using a first message, where the first message is a message for transmitting the C2 data, and the C2 data is data used by the UAVC to control the UAV.

In this embodiment, the foregoing specific message actually refers to the first message, and the first message is for transmitting the C2 data only, so that the non-C2 data cannot be transmitted using the first message. This prevents, without a need to switch a controller or disconnect the UAV from the UAVC, the non-C2 data from being transmitted. In actual application, there may be another type of second message, third message, or the like that is specially for transmitting the C2 data. This is not specifically limited in this embodiment.

In this embodiment, the target network element determines, based on the control plane C2 transmission indication, to allow to transmit the C2 data through the control plane, that is, determines to allow to transmit the C2 data using the first message. In this embodiment, because the first message is for transmitting the C2 data only, the control plane is mainly for receiving and sending the signaling, and the data size of the C2 data is not excessively large, the C2 data may be included in the first message. In this way, the non-C2 data whose data size is excessively large cannot be included in the first message. Therefore, similar to transmitting the signaling through the control plane, transmitting the C2 data through the control plane can prevent the non-C2 data from being transmitted. In addition, the UAVC is not disconnected from the UAV or a controller is not switched to control the UAV, and the UAVC can continue to be used to control the UAV. This ensures transmission of the C2 data and thus maintains control stability.

The foregoing mainly describes the processing method of the abnormally behaving unmanned aerial vehicle provided in embodiments of this application from a perspective of the target network element. The following describes in detail the processing method of the abnormally behaving unmanned aerial vehicle provided in embodiments of this application from a perspective of interaction when target network elements are respectively an AMF network element and an SMF network element.

The foregoing mainly describes the processing method of the abnormally behaving unmanned aerial vehicle provided in embodiments of this application from a perspective of the target network element. The following describes in detail the processing method of the abnormally behaving unmanned aerial vehicle provided in embodiments of this application from a perspective of interaction when target network elements are respectively an AMF network element and an SMF network element.

Figure 7:
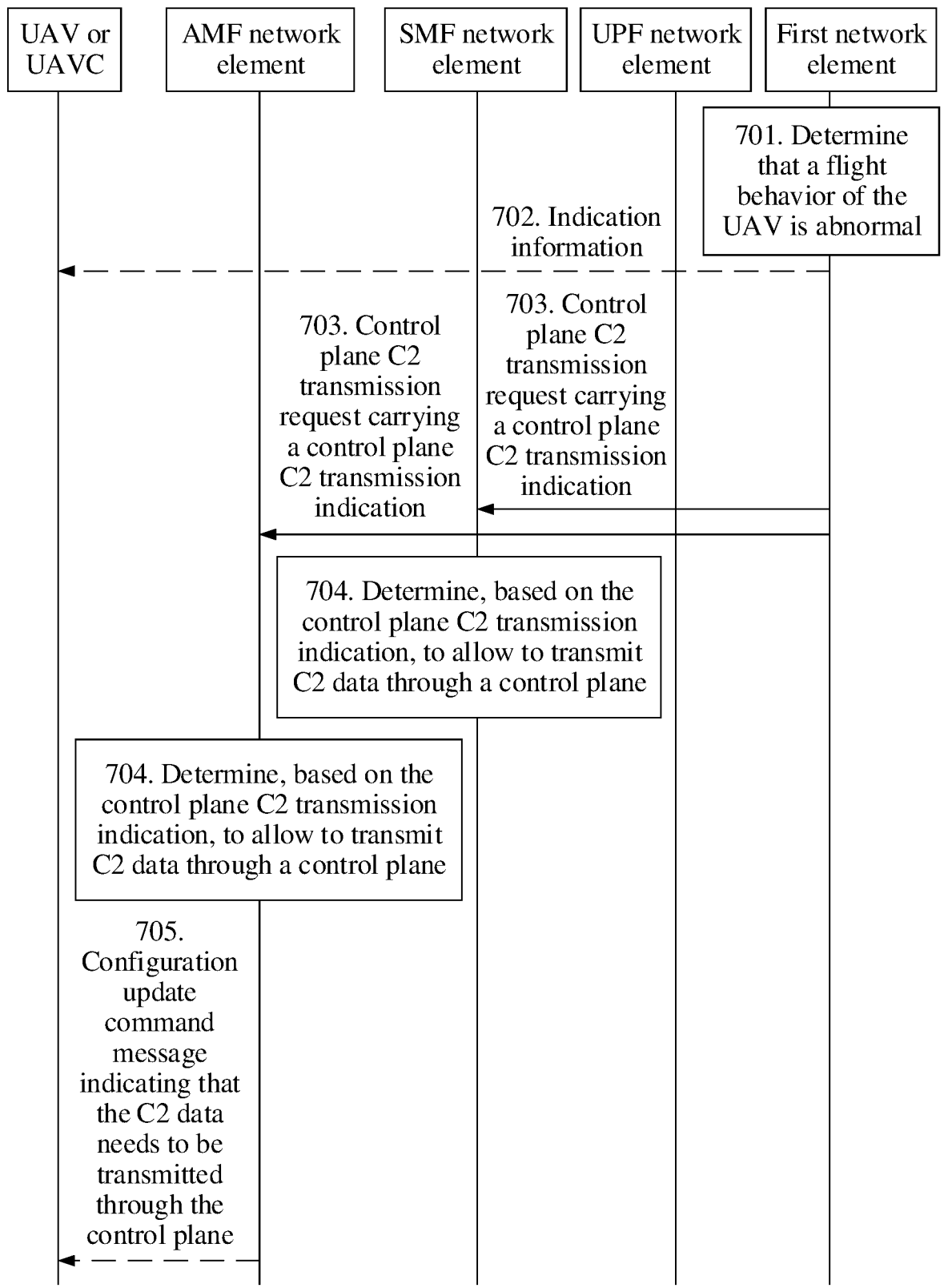
FIG. 7 is a schematic diagram of another embodiment of a processing method of an abnormally behaving unmanned aerial vehicle according to embodiments.

FIG. 7 is a schematic diagram of another embodiment of a processing method of an abnormally behaving unmanned aerial vehicle according to embodiments of this application. The method may include the following steps.

701. A first network element determines that a flight behavior of a UAV is abnormal.

Optionally, the method may further include 702.

702. The first network element sends indication information to the UAV or a UAVC.

In this embodiment, steps 701 and 702 may be understood with reference to steps 401 and 402 in FIG. 4. Details are not described herein again.

703. The first network element separately sends a control plane C2 transmission request to an AMF network element and an SMF network element, where the control plane C2 transmission request carries a control plane C2 transmission indication.

In this embodiment, a target network element in this scenario may include the AMF network element and the SMF network element. To be specific, the AMF network element and the SMF network element may receive the control plane C2 transmission request sent by the first network element, and obtain the control plane C2 transmission indication from the control plane C2 transmission request.

It should be noted that the control plane C2 transmission request may include identification information of the UAV or identification information of the UAVC, or may include one or more of a threshold of a size of a data packet, a threshold of a ratio of a quantity of uplink data packets to a quantity of downlink data packets, and a threshold of a transmission rate of the uplink/downlink data packet.

In addition, the first network element may send the control plane C2 transmission request to the AMF network element and the SMF network element in a plurality of manners. For example, the first network element may directly send the control plane C2 transmission request to the AMF network element, in other words, a NEF network element and a PCF network element are only responsible for transparently transmitting the control plane C2 transmission request: or may indirectly send the control plane C2 transmission request to the AMF network element, to be specific, the first network element sends the control plane C2 transmission request to a NEF network element, the NEF network element sends the control plane C2 transmission request to a PCF network element, and the PCF network element derives policy information based on the control plane C2 transmission request and sends the policy information to the AMF network element.

Alternatively, the first network element may directly send the control plane C2 transmission request to the SMF network element, in other words, a PCF network element and the AMF network element are only responsible for transparently transmitting the control plane C2 transmission request: or the first network element indirectly sends the control plane C2 transmission request to the SMF network element, to be specific, the first network element sends the control plane C2 transmission request to a PCF network element, and the PCF network element derives policy information based on the control plane C2 transmission request and sends the policy information to the SMF network element. It may be understood that a manner of sending the control plane C2 transmission request is not limited in this embodiment.

It should be noted that the NEF network element and the PCF network element are merely examples of intermediate network elements between the first network element and the AMF network element and between the first network element and the SMF network element. In actual application, the intermediate network element may alternatively be another network element. This is not specifically limited in this embodiment.

In addition, the control plane C2 transmission request may be an existing message type, an existing information element, a new message type, a new information element, or another possible message form. An existence form of the control plane C2 transmission request is not limited in this embodiment.

704. The AMF network element and the SMF network element separately determine, based on the control plane C2 transmission indication, to allow to transmit C2 data through a control plane. To transmit the C2 data through the control plane is to transmit the C2 data using a first message, where the first message is a message for transmitting the C2 data, and the C2 data is data used by the UAVC to control the UAV.

In this embodiment, step 704 may be understood with reference to step 602 in FIG. 6. Details are not specifically described herein again.

Optionally, the method further includes step 705.

705. The AMF network element sends a configuration update command message to the UAV or the UAVC, where the configuration update command message indicates that the C2 data needs to be transmitted through the control plane.

In this embodiment, after the AMF network element receives the control plane C2 transmission request sent by the first network element, the AMF network element may send the configuration update command message to the UAV or the UAVC. The configuration update command message indicates that the C2 data needs to be transmitted through the control plane, that is, the C2 data is transmitted using a specific message. In this way, after receiving the configuration update command message, the UAV or the UAVC may trigger a procedure of sending a registration request to the AMF network element.

It may be understood that if the configuration update command message indicates an acknowledgement request, the UAV or the UAVC may alternatively feed back an acknowledgement message to the AMF network element.

In this embodiment, the first network element sends the control plane C2 transmission indication to the AMF network element and the SMF network element, so that the AMF network element and the SMF network element separately determine, based on the control plane C2 transmission indication, to allow to transmit the C2 data through the control plane, that is, determines to allow to transmit the C2 data using the first message. In this embodiment, because the first message is for transmitting the C2 data only, the control plane is mainly for receiving and sending signaling, and a data size of the C2 data is not excessively large, the C2 data may be included in the first message. In this way, non-C2 data whose data size is excessively large cannot be included in the first message. Therefore, similar to transmitting the signaling through the control plane, transmitting the C2 data through the control plane can prevent the non-C2 data from being transmitted. In addition, the UAVC can continue to be used to control the UAV. This ensures transmission of the C2 data, and thus maintains control stability and avoids out-of-control of the UAV.

FIG. 7 mainly describes the processing method of the abnormally behaving unmanned aerial vehicle from a perspective of interaction in which the first network element separately sends the control plane C2 transmission indication to the AMF network element and the SMF network element. The target network element may not only complete, using a mobility management procedure, a negotiation process in which the C2 data is allowed to be transmitted through the control plane, but also complete a negotiation process at a session granularity in a session management manner. Therefore, the following separately describes different cases.

1. The negotiation process in which the C2 data is allowed to be transmitted through the control plane is completed using the mobility management procedure.

Figure 8:
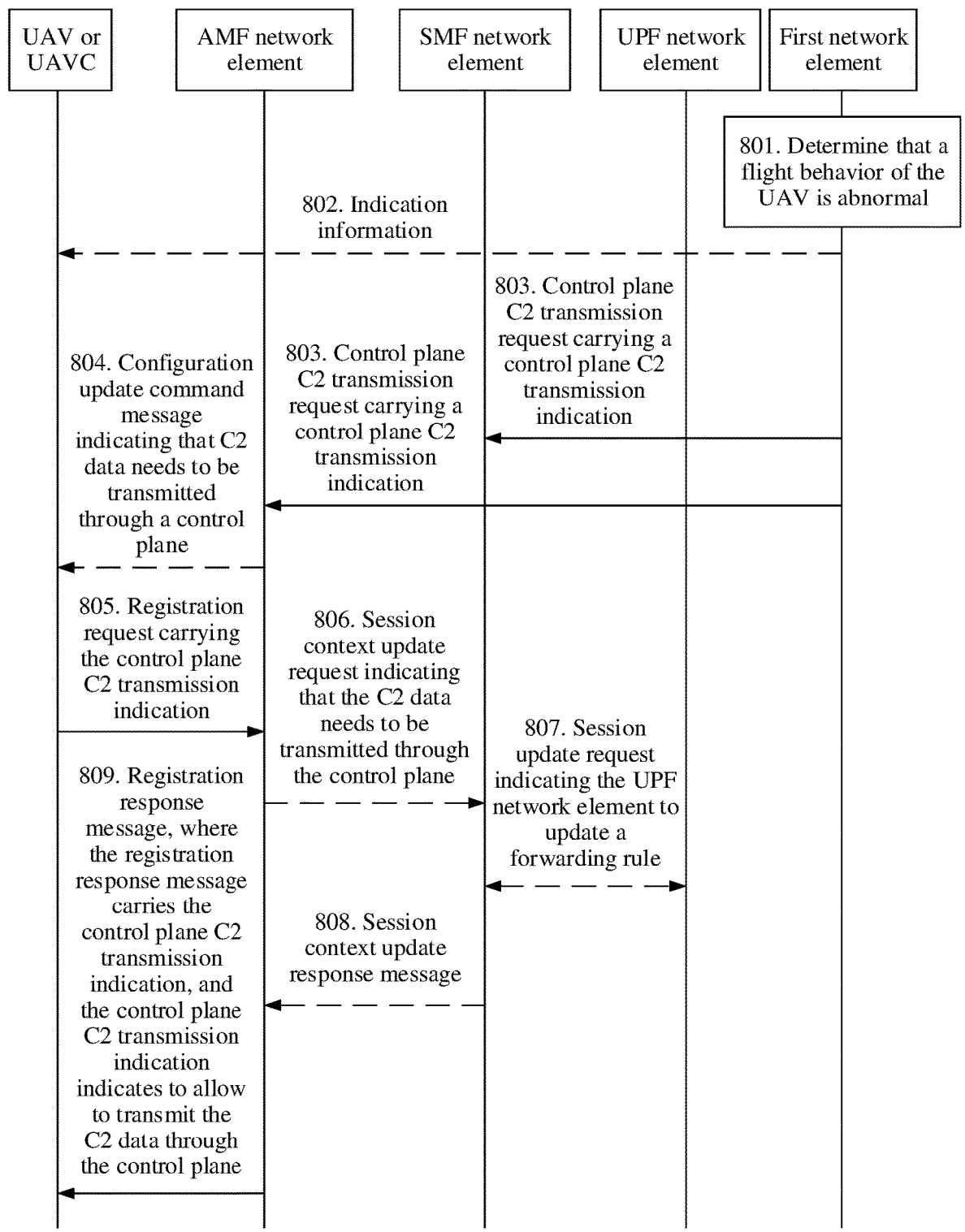
FIG. 8 is a schematic diagram of another embodiment of a processing method of an abnormally behaving unmanned aerial vehicle according to embodiments.

FIG. 8 is a schematic diagram of another embodiment of a processing method of an abnormally behaving unmanned aerial vehicle according to embodiments of this application. The method may include the following steps.

801. A first network element determines that a flight behavior of a UAV is abnormal.

802. The first network element sends indication information to a UAV or a UAVC.

803. The first network element separately sends a control plane C2 transmission request to an AMF network element and an SMF network element, where the control plane C2 transmission request carries a control plane C2 transmission indication.

804. The AMF network element sends a configuration update command message to the UAV or the UAVC, where the configuration update command message indicates that C2 data needs to be transmitted through a control plane.

In this embodiment, steps 801 to 803 may be understood with reference to steps 701 to 703 in FIG. 7, and step 804 may be understood with reference to step 705. Details are not described herein again.

805. The UAV or the UAVC sends a registration request to the AMF network element, where the registration request carries the control plane C2 transmission indication.

In this embodiment, the registration request may further include an identifier of a PDU session for transmitting the C2 data.

It should be noted that the UAV or the UAVC may send the registration request to the AMF network element in a plurality of scenarios. Examples are as follows:

1. If the configuration update command message in step 804 indicates the registration request, the UAV or the UAVC performs step 805.

2. In step 802, the UAV or the UAVC receives the indication information or the control plane C2 transmission indication that is sent by the first network element.

3. In step 802, the UAV or the UAVC may further receive a transmission stop indication or the control plane C2 transmission indication through an application plane.

In this embodiment, the transmission stop indication may indicate the UAV to stop transmitting non-C2 data to the UAVC, or indicate the UAVC to stop transmitting the non-C2 data to the UAV.

4. The UAV or the UAVC autonomously determines to transmit the C2 data through the control plane. For example, the UAV or the UAVC enters an energy-saving mode and does not transmit the non-C2 data. Details are not described herein.

It should be noted that, in the foregoing scenarios 2, 3, and 4, the foregoing steps 801 to 804 may not be performed, but the UAV or the UAVC directly performs step 805.

Optionally, the method further includes steps 806 to 808.

806. The AMF network element sends a session context update request to the SMF network element, where the session context update request indicates that the C2 data needs to be transmitted through the control plane.

In this embodiment, when the AMF network element performs, using a mobility management procedure, a negotiation process in which the C2 data is transmitted through the control plane, the AMF network element may further determine, based on a locally stored context or the identifier of the PDU session that is provided by the UAV or the UAVC, an SMF network element corresponding to the identifier of the PDU session for transmitting the C2 data. In this way, the AMF network element may send the session context update request to the SMF network element, and the session context update request may indicate that C2 needs to be transmitted through the control plane. In addition, the session context update request may also indicate the identifier of the session for transmitting the C2 data.

807. The SMF network element sends a session update request to a UPF network element, where the session update request indicates the UPF network element to update a forwarding rule.

It should be noted that the UPF network element may further send a session update response to the SMF network element after receiving the session update request, to notify the SMF network element that update is completed, and the like.

808. The SMF network element sends a session context update response message to the AMF network element.

In this embodiment, the session context update response message indicates that a session context has been updated.

809. The AMF network element sends a registration response message to the UAV or the UAVC, where the registration response message carries the control plane C2 transmission indication, and the control plane C2 transmission indication indicates to allow to transmit the C2 data through the control plane. To transmit the C2 data through the control plane is to transmit the C2 data using a first message, where the first message is a message for transmitting the C2 data, and the C2 data is data used by the UAVC to control the UAV.

In this embodiment, after completing the negotiation process of transmitting the C2 data through the control plane, the AMF network element sends the registration response message to the UAV or the UAVC, to indicate that registration is completed. In addition, it should be understood that, if the registration response message does not carry the control plane C2 transmission indication, it is considered by default that the registration response message can indicate that the C2 data is allowed to be transmitted through the control plane.

In this embodiment, the UAV or the UAVC sends the control plane C2 transmission indication to the AMF network element, so that the AMF network element completes deactivation of a user plane using the mobility management procedure, and determines, based on the control plane C2 transmission indication, to allow to transmit the C2 data through the control plane, that is, determines to allow to transmit the C2 data using the first message. In this embodiment, because the first message is for transmitting the C2 data only, the control plane is mainly for receiving and sending signaling, and a data size of the C2 data is not excessively large, the C2 data may be included in the first message. In this way, non-C2 data whose data size is excessively large cannot be included in the first message. Therefore, similar to transmitting the signaling through the control plane, transmitting the C2 data through the control plane can prevent the non-C2 data from being transmitted. In addition, the UAVC can continue to be used to control the UAV. This ensures transmission of the C2 data and thus maintains control stability.

2. The negotiation process in which the C2 data is allowed to be transmitted through the control plane is completed in the session management manner.

Figure 9A:
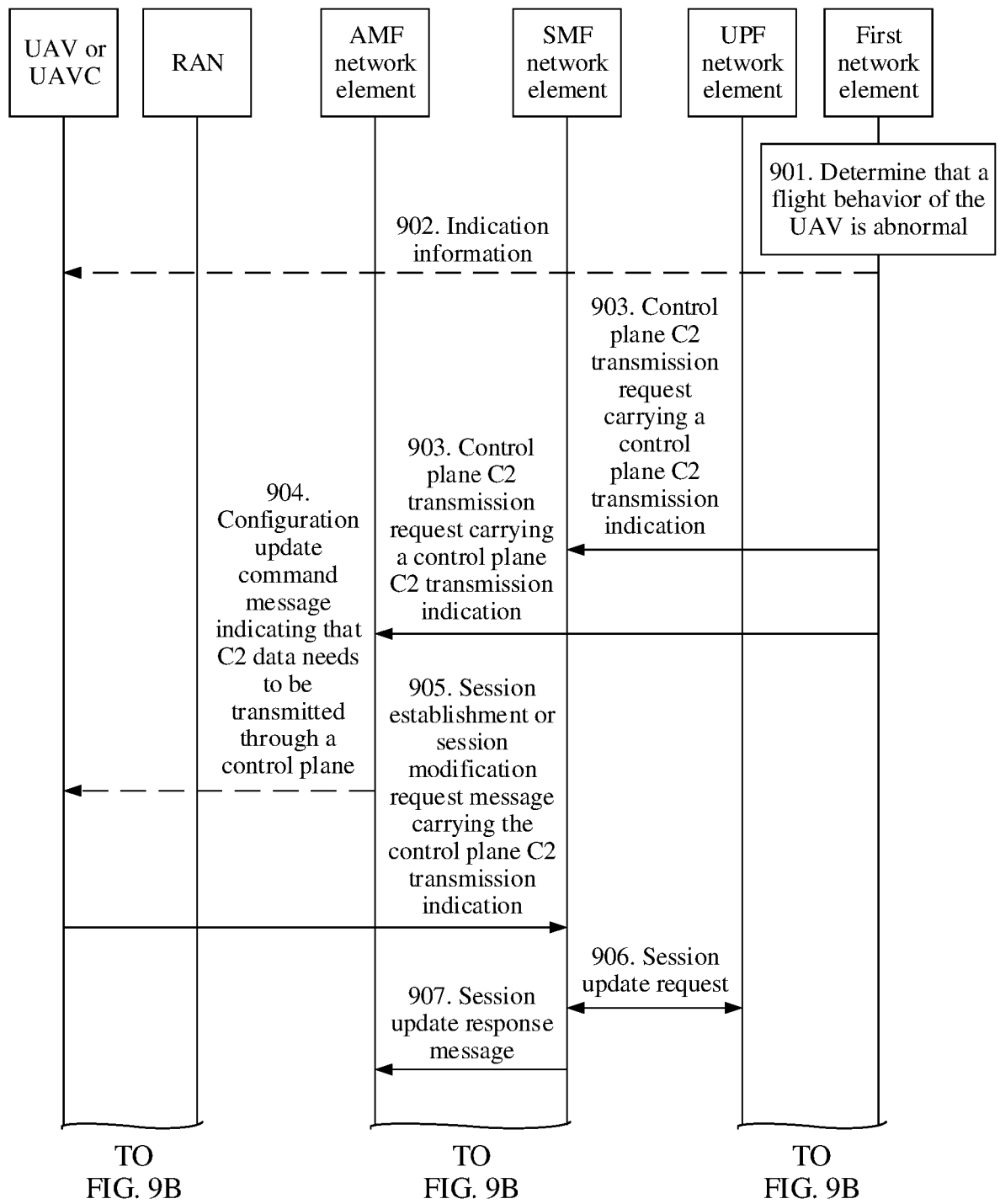
FIG. 9A and FIG. 9B are a schematic diagram of another embodiment of a processing method of an abnormally behaving unmanned aerial vehicle according to embodiments.
Figure 9B:
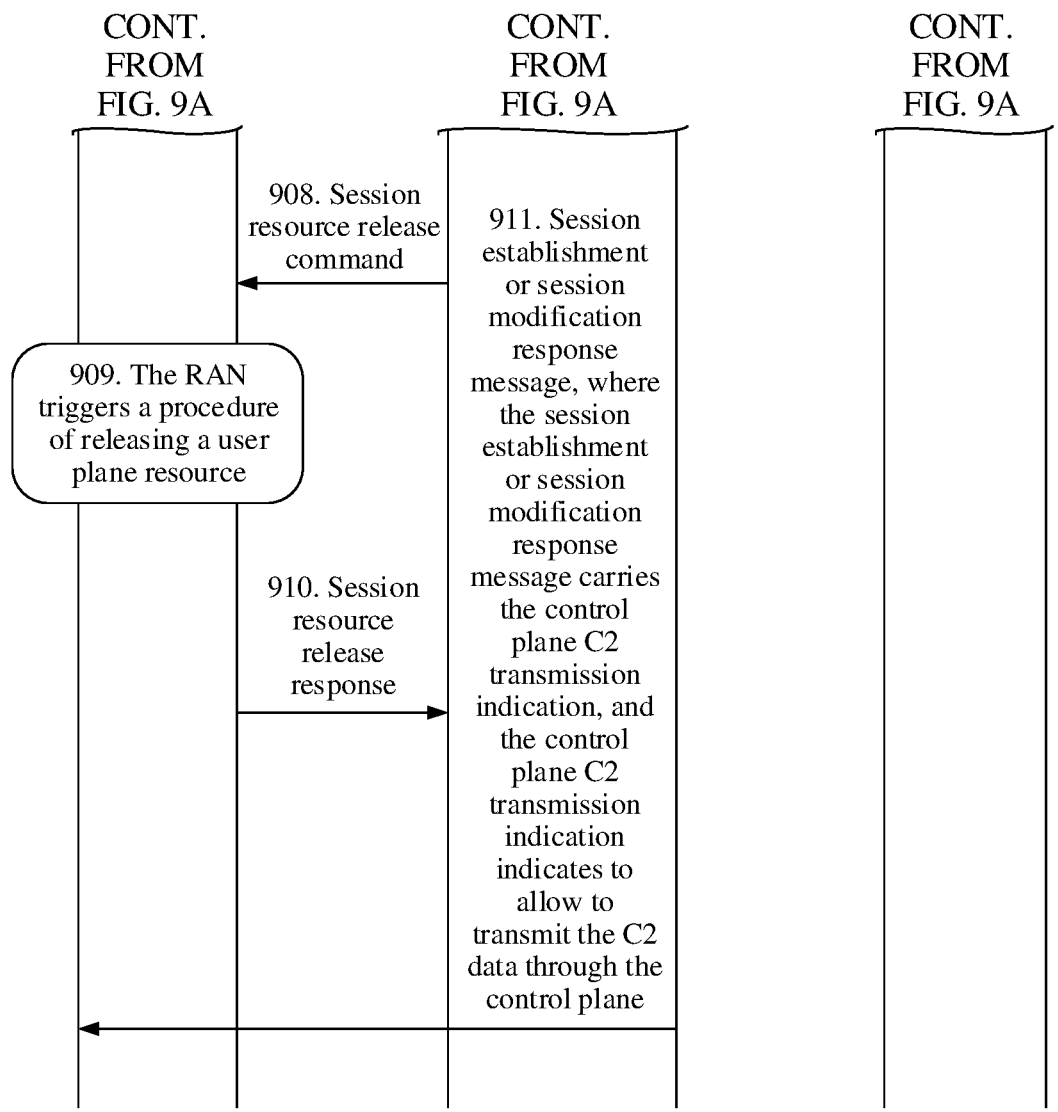
Figure 10A:
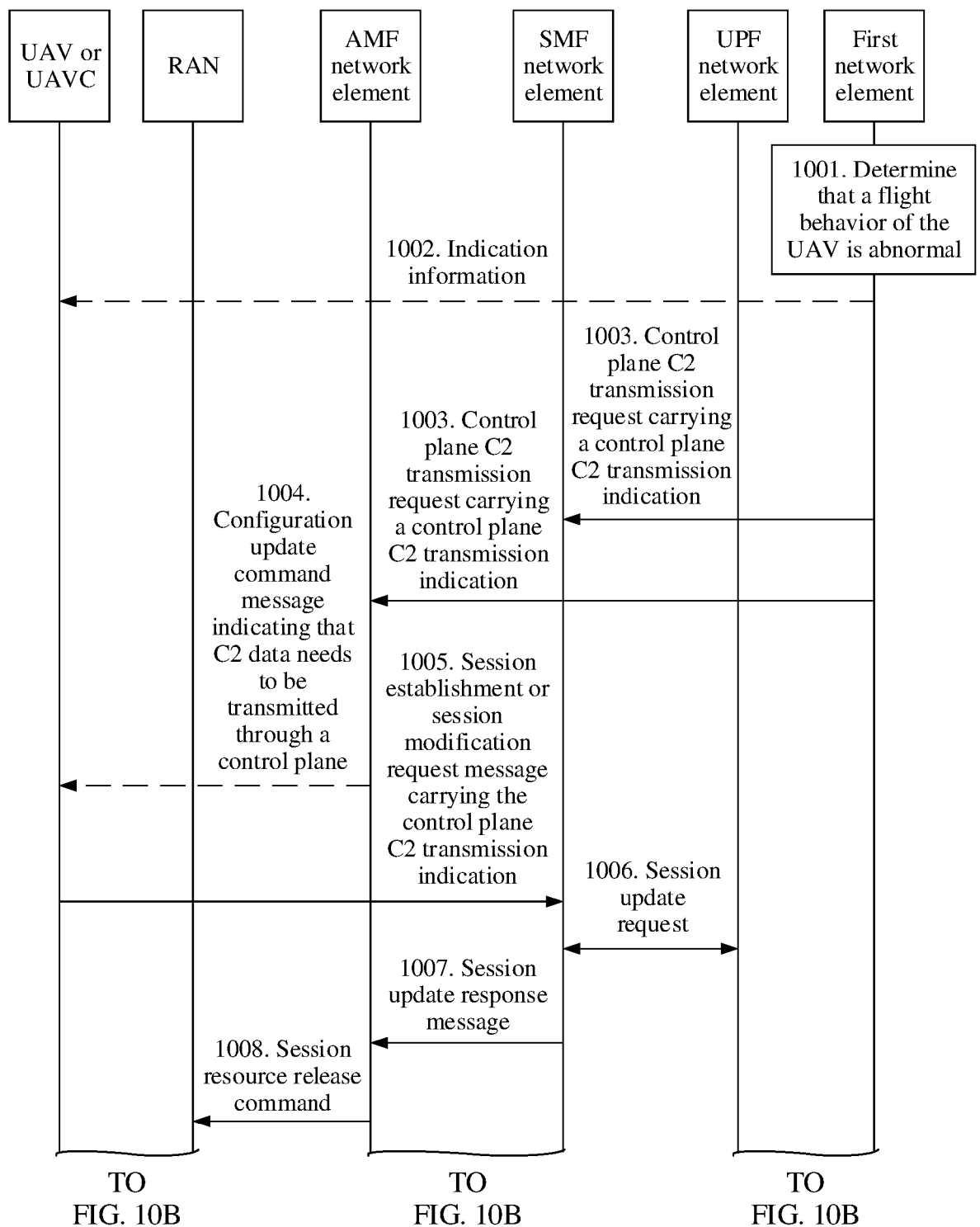
FIG. 10A and FIG. 10B are a schematic diagram of another embodiment of a processing method of an abnormally behaving unmanned aerial vehicle according to embodiments.
Figure 10B:
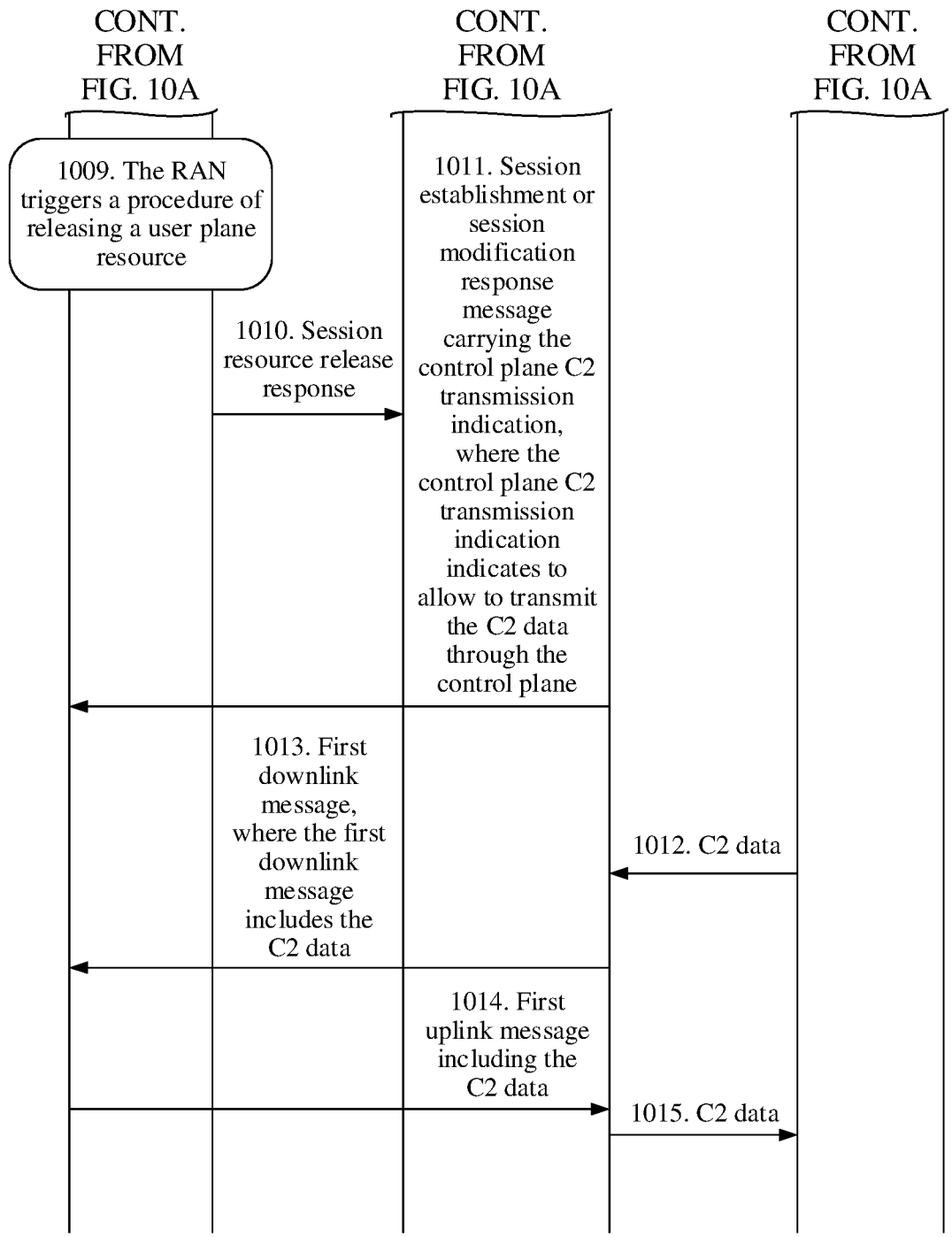

FIG. 9A and FIG. 9B are a schematic diagram of another embodiment of a processing method of an abnormally behaving unmanned aerial vehicle according to embodiments of this application. The method may include the following steps.

901. A first network element determines that a flight behavior of a UAV is abnormal.

902. The first network element sends indication information to the UAV or a UAVC.

903. The first network element separately sends a control plane C2 transmission request to an AMF network element and an SMF network element, where the control plane C2 transmission request carries a control plane C2 transmission indication.

904. The AMF network element sends a configuration update command message to the UAV or the UAVC, where the configuration update command message indicates that C2 data needs to be transmitted through a control plane.

905. The UAV or the UAVC sends a session establishment or session modification request message to the SMF network element, where the session establishment or session modification request message carries the control plane C2 transmission indication.

In this embodiment, the session establishment or session modification request message is a session management message, and finally needs to be sent to the SMF network element. However, in a transmission process, the session establishment or session modification request message needs to pass through the AMF network element, and the session establishment or session modification request message needs to be included in a mobility management message sent by the UAV or the UAVC to the AMF network element. The AMF network element includes the session establishment or session modification request message using a service operation message between the AMF network element and the SMF network element, to send the session establishment or session modification request message to the SMF network element. The UAV or the UAVC sends the control plane C2 transmission indication to the SMF network element in a plurality of implementations. For understanding, refer to the following:

Implementation 1: The control plane C2 transmission indication is included in the mobility management message sent by the UAV or the UAVC to the AMF network element, and the session establishment or session modification request message does not include the control plane C2 transmission indication. After receiving the mobility management message, if determining, based on the control plane C2 transmission indication, to allow to transmit the C2 data transmission through the control plane, the AMF network element includes the control plane C2 transmission indication in the service operation message sent to the SMF network element.

Implementation 2: The control plane C2 transmission indication is included in the session establishment or session modification request message.

It should be understood that in actual application, another implementation may be further included. This is not specifically limited in this embodiment.

In addition, it should be noted that the UAV or the UAVC may send the session establishment or session modification request message to the SMF network element in a plurality of scenarios. Examples are as follows:

1. If the configuration update command message in step 904 carries the control plane C2 transmission indication, the UAV or the UAVC may directly perform step 905.

2. In step 902, the UAV or the UAVC receives the indication information or the control plane C2 transmission indication that is sent by the first network element.

3. In step 902, the UAV or the UAVC may further receive a transmission stop indication or the control plane C2 transmission indication through an application plane.

2 and 3 in this embodiment may be understood with reference to the scenarios 2 and 3 in FIG. 7. Details are not described herein again.

4. The UAV or the UAVC autonomously determines to transmit the C2 data through the control plane. For example, the UAV or the UAVC enters an energy-saving mode and does not transmit non-C2 data. Details are not described herein.

5. After negotiation in the mobility management procedure in FIG. 8, it is determined that the C2 data is allowed to be transmitted through the control plane, and steps 806 to 808 are not performed.

It should be noted that, in the foregoing scenarios 2, 3, and 4, the foregoing steps 901 to 904 may not be performed, but the UAV or the UAVC directly performs step 905.

906. The SMF network element sends a session update request to a UPF network element.

In this embodiment, the session update request indicates the UPF network element to update a forwarding rule, and indicates the UPF network element to release a user plane resource.

In addition, it should be noted that the SMF network element may send the session establishment or session modification request message to the UPF network element in a plurality of scenarios. Examples are as follows:

1. Step 905 is performed.

2. In step 902, the UAV or the UAVC receives the indication information or the control plane C2 transmission indication that is sent by the first network element.

3. The SMF network element autonomously determines to transmit the C2 data through the control plane. For example, the SMF network element subscribes to a region of interest, for example, a no-fly zone, from the AMF network element. In this case, the AMF network element notifies the SMF network element that the UAV has entered the no-fly zone. In this way, the SMF network element determines that it is not allowed to continue to transmit non-C2 data. Details are not described herein.

It should be noted that the UPF network element may further send a session update response to the SMF network element after receiving the session update request, to notify the SMF network element that update is completed, and the like.

907. The SMF network element sends a session update response message to the AMF network element.

In this embodiment, the session update response message indicates that a session has been updated. In addition, the session update response message may further include a session resource release indication, where the session resource release indication indicates the AMF network element to trigger a RAN to release a user plane resource corresponding to a PDU session.

908. The AMF network element sends a session resource release command to the RAN.

In this embodiment, the session resource release command indicates the RAN to release the user plane resource corresponding to the PDU session.

909. The RAN triggers a procedure of releasing the user plane resource.

Specifically, the RAN exchanges a message with the UAVC or the UAV to release the user plane resource corresponding to the PDU session.

910. The RAN sends a session resource release response to the AMF network element.

In this embodiment, the session resource release response indicates that the user plane resource corresponding to the PDU session has been released.

911. The SMF network element sends a session establishment or session modification response message to the UAV or the UAVC, where the session establishment or session modification response message carries the control plane C2 transmission indication, and the control plane C2 transmission indication indicates to allow to transmit the C2 data through the control plane. To transmit the C2 data through the control plane is to transmit the C2 data using a first message, where the first message is a message for transmitting the C2 data, and the C2 data is data used by the UAVC to control the UAV.

In this embodiment, the SMF network element may directly send the session establishment or session modification response message to the UAV or the UAVC, or certainly may indirectly send the session establishment or session modification response message via the AMF network element. For details, refer to step 905 for understanding. Details are not described herein again. In addition, the session establishment or session modification response message may alternatively be sent to the UAV or the UAVC when 908 and 909 are performed.

In addition, it should be understood that an execution sequence of the foregoing steps 906 to 910 and step 911 is not limited.

In this embodiment, the UAV or the UAVC sends the control plane C2 transmission indication to the SMF network element, so that the SMF network element completes deactivation of a user plane in a session management manner, and determines, based on the control plane C2 transmission indication, to allow to transmit the C2 data through the control plane, that is, determines to allow to transmit the C2 data using the first message. In this embodiment, because the first message is for transmitting the C2 data only, the control plane is mainly for receiving and sending signaling, and a data size of the C2 data is not excessively large, the C2 data may be included in the first message. In this way, the non-C2 data whose data size is excessively large cannot be included in the first message. Therefore, similar to transmitting the signaling through the control plane, transmitting the C2 data through the control plane can prevent the non-C2 data from being transmitted. In addition, the UAVC is not disconnected from the UAV or a controller is not switched to control the UAV, and the UAVC can continue to be used to control the UAV. This ensures transmission of the C2 data and thus maintains control stability.

FIG. 7, FIG. 8, and FIG. 9A and FIG. 9B mainly describe, from different receiving manners, the negotiation procedure in which the C2 data is allowed to be transmitted through the control plane. Based on FIG. 9A and FIG. 9B, FIG. 10A and FIG. 10B are a schematic diagram of another embodiment of a processing method of an abnormally behaving unmanned aerial vehicle according to embodiments of this application. The method may further include the following steps.

1001. A first network element determines that a flight behavior of a UAV is abnormal.

1002. The first network element sends indication information to the UAV or a UAVC.

1003. The first network element separately sends a control plane C2 transmission request to an AMF network element and an SMF network element, where the control plane C2 transmission request carries a control plane C2 transmission indication.

1004. The AMF network element sends a configuration update command message to the UAV or the UAVC, where the configuration update command message indicates that C2 data needs to be transmitted through a control plane.

1005. The UAV or the UAVC sends a session establishment or session modification request message to the SMF network element, where the session establishment or session modification request message carries the control plane C2 transmission indication.

1006. The SMF network element sends a session update request to a UPF network element.

1007. The SMF network element sends a session update response message to the AMF network element.

1008. The AMF network element sends a session resource release command to a RAN.

1009. The RAN triggers a procedure of releasing a user plane resource.

1010. The RAN sends a session resource release response to the AMF network element.

1011. The SMF network element sends a session establishment or session modification response message to the UAV or the UAVC, where the session establishment or session modification response message carries the control plane C2 transmission indication, and the control plane C2 transmission indication indicates to allow to transmit the C2 data through the control plane. To transmit the C2 data through the control plane is to transmit the C2 data using a first message, where the first message is a message for transmitting the C2 data, and the C2 data is data used by the UAVC to control the UAV.

In this embodiment, steps 1001 to 1011 may be understood with reference to steps 901 to 911 in FIG. 9. Details are not described herein again.

Optionally, in some other embodiments, the SMF network element may alternatively send a third rule to the UPF network element, where the third rule includes a first sub-rule and a second sub-rule.

In this embodiment, the first sub-rule indicates, when the UPF network element receives the C2 data, the UPF network element to send the C2 data to a core network element such as the SMF network element. The second sub-rule indicates, when the UPF network element receives the C2 data sent by the SMF, the UPF network element to send the C2 data to a second network element.

It should be noted that the second network element may be understood as a UPF network element on a peer side. For example, if a current UPF network element is a UPF network element corresponding to the UAV, the second network element may be understood as a UPF network element corresponding to the UAVC. Similarly, if a current UPF network element is a UPF network element corresponding to the UAVC, the second network element may be understood as a UPF network element corresponding to the UAV. This is not specifically limited in this embodiment.

It may be understood that, that the SMF network element sends the third rule to the UPF network element may be performed synchronously with step 1006, or may be performed synchronously with step 807 in FIG. 8. To be specific, in step 1006 or step 807, in addition to sending the session update request to the UPF network element, the SMF network element may further provide the third rule and the like for the UPF network element.

1012. The UPF network element sends the C2 data to the SMF network element.

1013. The SMF network element sends a first downlink message to the UAV or the UAVC, where the first downlink message includes the C2 data.

In this embodiment, the first downlink message is included in the first message in step 1011. It may be understood that, in actual application, the first downlink message may alternatively be a steering control message, or may be another type of message specially for sending downlink C2 data. This is not specifically limited herein.

1014. The UAV or the UAVC sends a first uplink message to the SMF network element, where the first uplink message includes the C2 data.

1015. The SMF network element sends the C2 data included in the first uplink message to the UPF network element.

In this embodiment, the first uplink message is included in the first message in step 1011. It may be understood that, in actual application, the first uplink message may alternatively be a steering feedback message, or may be another type of message specially for sending uplink C2 data. This is not specifically limited herein.

It should be noted that steps 1012 and 1013 are performed first, and then steps 1014 to 1016 are performed. The UAV or the UAVC sends the corresponding first uplink message only after receiving the first downlink message from the SMF network element. If the UAV or the UAVC does not receive the first downlink message from the SMF network element but actively sends the corresponding first uplink message, the AMF network element or the SMF network element may determine that there may be an abnormal situation in which, for example, non-C2 data may be transmitted between the UAV and the UAVC, and therefore refuses to forward or receive the first uplink message. In this way, the AMF network element or the SMF network element may further report the abnormal situation to the first network element, or may report an abnormal characteristic to the first network element, and the first network element may process data in the first uplink message based on the abnormal situation. For details, refer to step 408 in FIG. 4. Details are not described herein again.

In addition, it may be further understood that, if the control plane C2 transmission request in step 1003 carries one or more of a threshold of a size of a data packet, a threshold of a ratio of a quantity of uplink data packets to a quantity of downlink data packets, and a threshold of a transmission rate of the uplink/downlink data packet, the SMF network element or the AMF network element detects the first message when receiving the first message.

For example, if a size of the message is abnormal or sending and receiving rates of the message are abnormal, the abnormal situation is reported to a UTM. For a detection on the ratio of the quantity of uplink data packets to the quantity of downlink data packets, if the ratio is not 1, the AMF network element or the SMF network element reports abnormality only when a ratio of a quantity of first uplink messages to a quantity of first downlink messages is not equal to the provided threshold of the ratio of the quantity of uplink data packets to the quantity of downlink data packets. To identify a correspondence between the first uplink message and the first downlink message, a corresponding message sequence indication may be carried in the first uplink message and the first downlink message. For example, if the threshold of the ratio of the quantity of uplink data packets to the quantity of downlink data packets requires that one first downlink message corresponds to no more than one first uplink message, when the first message is detected, whether abnormality occurs may be determined using the message sequence indication.

It should be noted that a representation manner and an implementation of the message sequence indication are not limited in this application. For example, the message sequence indication may be included in a session management message, or may be included in a mobility management message.

It should be noted that steps 1012 to 1015 in this embodiment may alternatively be performed after step 704 in FIG. 7 or after step 809 in FIG. 8.

In this embodiment, the first message is for transmitting the C2 data only. This can prevent the non-C2 data from being transmitted to the UAVC or the UAV. In addition, the UAVC is not disconnected from the UAV or a controller is not switched to control the UAV, and the UAVC can continue to be used to control the UAV. This ensures transmission of the C2 data and thus maintains control stability.

The foregoing mainly describes the solutions provided in embodiments of this application from a perspective of interaction between the network elements. It may be understood that, to implement the foregoing functions, the SMF network element, the UPF network element, and the first network element include corresponding hardware structures and/or software modules for performing the functions. A person skilled in the art should be easily aware that, in combination with functions described in embodiments disclosed in this specification, this application may be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

From a perspective of an entity device, the SMF network element, the UPF network element, or the first network element may be implemented by one entity device, may be jointly implemented by a plurality of entity devices, or may be a logic functional unit in one entity device. This is not specifically limited in embodiments of this application.

Figure 11:
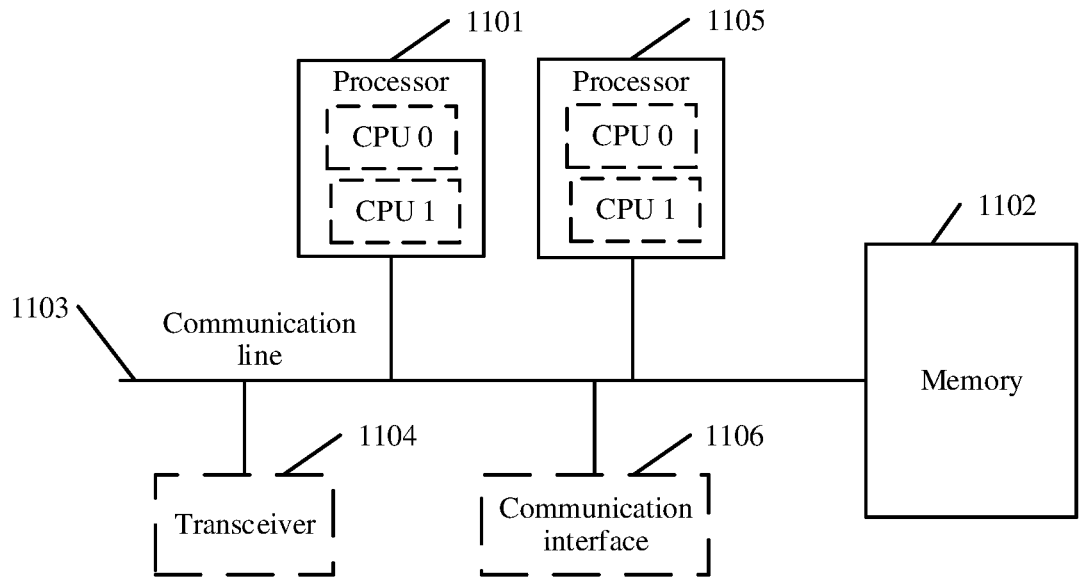
FIG. 11 is a schematic diagram of a hardware structure of a communication device according to an embodiment of this application.

For example, the SMF network element, the UPF network element, or the first network element may be implemented by a communication device in FIG. 11. FIG. 11 is a schematic diagram of a hardware structure of a communication device according to an embodiment of this application. The communication device includes at least one processor 1101, a memory 1102, a communication line 1103, and a transceiver 1104.

The processor 1101 may be a general central processing unit (CPU), a microprocessor, an application-specific integrated circuit (server IC), or one or more integrated circuits for controlling program execution of the solutions of this application.

The communication line 1103 may include a path transmitting information between the foregoing components.

The transceiver 1104 is any transceiver-type apparatus, and is configured to communicate with another device or a communication network such as Ethernet, a radio access network (RAN), or a wireless local area network (WLAN). The transceiver 1104 may alternatively be a transceiver circuit or a transceiver. The communication device may further include a communication interface 1106.

The memory 1102 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer, but is not limited thereto. The memory may exist independently, and is connected to the processor 1101 through the communication line 1103. Alternatively, the memory 1102 may be integrated with the processor 1101.

The memory 1102 is configured to store computer-executable instructions for performing the solutions in this application, and the processor 1101 controls execution. The processor 1101 is configured to execute the computer-executable instructions stored in the memory 1102, to implement the processing method of an abnormally behaving unmanned aerial vehicle provided in the foregoing method embodiments of this application.

In a possible implementation, the computer-executable instructions in embodiments of this application may also be referred to as application program code. This is not specifically limited in embodiments of this application.

In specific implementation, in an embodiment, the processor 1101 may include one or more CPUs, for example, a CPU 0 and a CPU 1 in FIG. 11.

In specific implementation, in an embodiment, the communication device may include a plurality of processors, for example, the processor 1101 and a processor 1105 in FIG. 11. Each of the processors may be a single-core (single-CPU) processor, or may be a multi-core (multi-CPU) processor. The processor herein may refer to one or more devices, circuits, and/or processing cores configured to process data (for example, the computer-executable instructions).

From a perspective of a functional unit, in this application, the SMF network element, the UPF network element, and the first network element may be divided into functional units based on the foregoing method embodiment. For example, each functional unit may be obtained through division based on a corresponding function, or two or more functions may be integrated into one functional unit. The integrated functional unit may be implemented in a form of hardware, or may be implemented in a form of a software functional unit.

Figure 12:
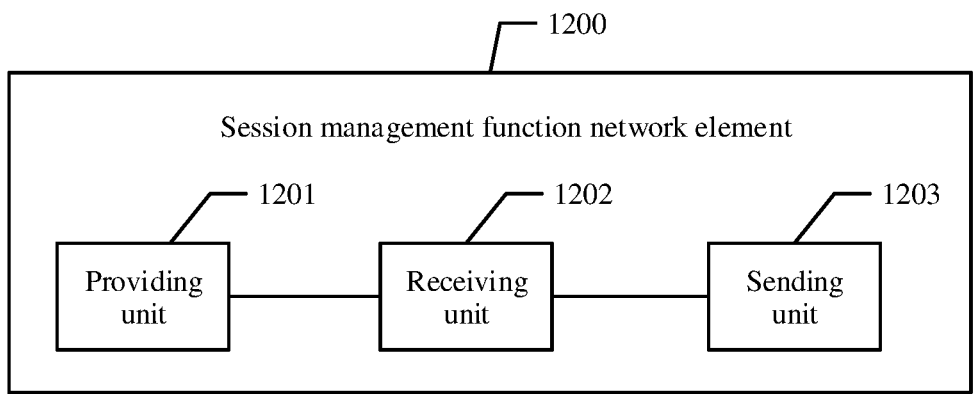
FIG. 12 is a schematic diagram of a hardware structure of a session management function network element according to an embodiment of this application.

For example, when each functional unit is obtained through division in an integrated manner, FIG. 12 is a schematic diagram of a structure of a session management function network element. As shown in FIG. 12, an embodiment of a session management function network element 1200 in this application may include a providing unit 1201, a receiving unit 1202, and a sending unit 1203.

The providing unit 1201 is configured to provide a first rule for a user plane function (UPF) network element, where the first rule indicates the UPF network element to detect, from a target transmission data packet, a data packet for transmitting non-command and control (non-C2) data, and the target transmission data packet is a data packet between an unmanned aerial vehicle (UAV) and an unmanned aerial vehicle controller (UAVC).

The receiving unit 1202 is configured to receive a first session report sent by the UPF network element.

The sending unit 1203 is configured to send an abnormal traffic report to a first network element based on the first session report received by the receiving unit 1202, where the abnormal traffic report includes one or more of identification information of the UAV, identification information of the UAVC, and identification information of an unmanned aerial system (UAS) including the UAV and the UAVC.

In some embodiments of this application, the receiving unit 1202 is further configured to: before the providing unit 1201 provides the first rule for the UPF network element, receive an abnormal data detection request sent by the first network element.

Correspondingly, the providing unit 1201 is configured to provide the first rule for the UPF network element based on the abnormal data detection request received by the receiving unit 1202.

In some embodiments of this application, the abnormal data detection request includes one or more of the identification information of the UAV, the identification information of the UAVC, the identification information of the UAS, and a session identifier, and the session identifier indicates a session for data transmission between the UAV and the UAVC.

In some embodiments of this application, the first session report includes an abnormal characteristic of the data packet for transmitting the non-C2 data, the abnormal characteristic includes one or more of abnormality of a data packet size, abnormality of a ratio of a quantity of uplink data packets to a quantity of downlink data packets, or abnormality of a transmission rate of the uplink/downlink data packet, and the session management function network element 1200 may further include:

a determining unit, configured to determine a second rule based on the abnormal rule, the forwarding rule is for forwarding, to the first network element or a first apparatus, the data packet for transmitting the non-C2 data, and the first apparatus is a third-party entity configured to control the UAV: where the sending unit 1203 is configured to send the second rule to the UPF network element.

In some embodiments of this application, the first rule may include one or more of a threshold of the data packet size, a threshold of the ratio of the quantity of uplink data packets to the quantity of downlink data packets, and a threshold of the transmission rate of the uplink/downlink data packet.

In some embodiments of this application, the sending unit 1203 is configured to send a detection duration to the UPF network element, so that the UPF network element detects, within the detection duration from the target transmission data packet according to the first rule, the data packet for transmitting the non-C2 data.

The session management function network element 1200 provided in this embodiment is configured to perform the method performed by the SMF network element in the method embodiment corresponding to FIG. 4 or FIG. 5. Therefore, for understanding of this embodiment, refer to the related descriptions in the method embodiment corresponding to FIG. 4 or FIG. 5.

In this embodiment, the session management function network element 1200 is presented in a form of functional units divided through integration. The "functional unit" herein may be an application-specific integrated circuit (ASIC), a processor that executes one or more software or firmware programs and a memory, an integrated logic circuit, and/or another device that can provide the foregoing functions. In a simple embodiment, a person skilled in the art may figure out that the session management function network element 1200 may be in the form shown in FIG. 11.

For example, the processor 1101 in FIG. 11 may invoke the computer-executable instructions stored in the memory 1102, so that the session management function network element 1200 performs the method performed by the session management function network element in the method embodiment corresponding to FIG. 4 or FIG. 5.

Specifically, functions/implementation processes of the providing unit 1201, the receiving unit 1202, and the sending unit 1203 in FIG. 12 may be implemented by the processor 1101 in FIG. 11 by invoking the computer-executable instructions stored in the memory 1102. Alternatively, a function/an implementation process of the providing unit 1201 in FIG. 12 may be implemented by the processor 1101 in FIG. 11 by invoking the computer-executable instructions stored in the memory 1102; and functions/implementation processes of the receiving unit 1202 and the sending unit 1203 in FIG. 12 may be implemented by the transceiver 1104 in FIG. 11.

The session management function network element 1200 provided in this embodiment may be configured to perform the method in the embodiment corresponding to FIG. 4 or FIG. 5. Therefore, for a technical effect that can be obtained in this embodiment, refer to the method embodiment corresponding to FIG. 4 or FIG. 5. Details are not described herein again.

In this embodiment, the SMF network element provides the first rule for the UPF network element, so that the UPF network element not only detects, according to the first rule, the data packet for transmitting the non-C2 data, but also feeds back the first session report to the SMF network element. The SMF network element sends the abnormal traffic report to the first network element based on the first session report. In this way, the first network element having a supervision function can process, based on the abnormal traffic report, the data packet for transmitting the non-C2 data. This not only implements detection on the data packet for transmitting the non-C2 data, but also prevents, through processing by the first network element on the data packet for transmitting the non-C2 data, the data packet for transmitting the non-C2 data from being transmitted to the UAVC or the UAV. In addition, the UAVC can continue to be used to control the UAV, to improve control stability.

Figure 13:
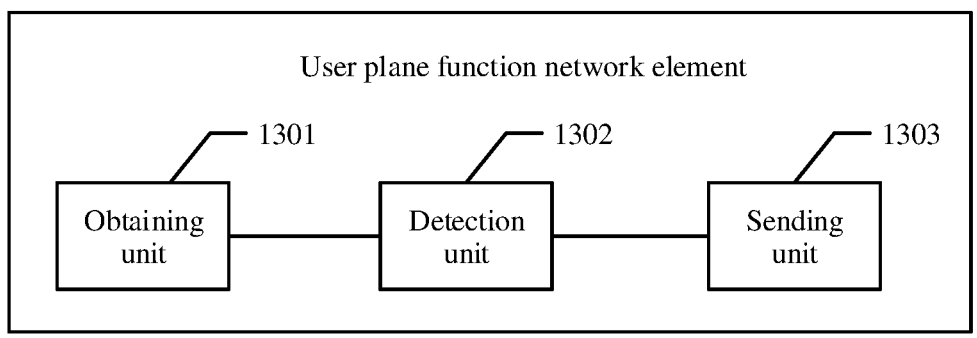
FIG. 13 is a schematic diagram of a hardware structure of a user plane function network element according to an embodiment of this application.

For example, when each functional unit is obtained through division in an integrated manner, FIG. 13 is a schematic diagram of a structure of a user plane function network element. As shown in FIG. 13, an embodiment of a user plane function network element 1300 in this application may include an obtaining unit 1301, a detection unit 1302, and a sending unit 1303.

The obtaining unit 1301 is configured to obtain a first rule.

The detection unit 1302 is configured to detect, from a target transmission data packet according to the first rule obtained by the obtaining unit 1301, a data packet for transmitting non-command and control (non-C2) data, where the target transmission data packet is a data packet between an unmanned aerial vehicle (UAV) and an unmanned aerial vehicle controller (UAVC).

The sending unit 1303 is configured to send a first session report to an SMF network element.

In some embodiments of this application, the user plane function network element 1300 further includes a processing unit.

The obtaining unit 1301 is further configured to: after the sending unit 1303 sends the first session report to the SMF network element, receive a second rule sent by the SMF network element, where the second rule includes one of a packet discarding rule, a cache rule, or a forwarding rule, the forwarding rule is for forwarding, to a first network element or a first apparatus, the data packet for transmitting the non-C2 data, and the first apparatus is a third-party entity configured to control the UAV.

The processing unit is configured to process, according to one of the packet discarding rule, the cache rule, or the forwarding rule, the data packet for transmitting the non-C2 data.

In some embodiments of this application, the first session report includes an abnormal characteristic of the data packet for transmitting the non-C2 data, and the abnormal characteristic includes one or more of abnormality of a data packet size, abnormality of a ratio of a quantity of uplink data packets to a quantity of downlink data packets, or abnormality of a transmission rate of the uplink/downlink data packet.

The abnormality of the data packet size is abnormality that the data packet size of the target transmission data packet is greater than a threshold of a size of a single data packet that is in the first rule, the abnormality of the ratio of the quantity of uplink data packets to the quantity of downlink data packets is abnormality that the ratio of the quantity of uplink data packets in the target transmission data packet to the quantity of downlink data packets in the target transmission data packet is not equal to a threshold of the ratio of the quantity of uplink data packets to the quantity of downlink data packets that is in the first rule, or abnormality that the ratio of the quantity of uplink data packets to the quantity of downlink data packets does not fall within a range corresponding to the threshold of the ratio of the quantity of uplink data packets to the quantity of downlink data packets, and the abnormality of the transmission rate of the uplink/downlink data packet is abnormality that the transmission rate of the uplink/downlink data packet is greater than a threshold of the transmission rate of the uplink/downlink data packet that is in the first rule.

The user plane function network element 1300 provided in this embodiment is configured to perform the method performed by the user plane function network element in the method embodiment corresponding to FIG. 4 or FIG. 5. Therefore, for understanding of this embodiment, refer to the related descriptions in the method embodiment corresponding to FIG. 4 or FIG. 5.

In this embodiment, the user plane function network element 1300 is presented in a form of functional units divided through integration. The "functional unit" herein may be an application-specific integrated circuit (ASIC), a processor that executes one or more software or firmware programs and a memory, an integrated logic circuit, and/or another device that can provide the foregoing functions. In a simple embodiment, a person skilled in the art may figure out that the user plane function network element 1300 may be in the form shown in FIG. 11.

For example, the processor 1101 in FIG. 11 may invoke the computer-executable instructions stored in the memory 1102, so that the user plane function network element 1300 performs the method performed by the user plane function network element in the method embodiment corresponding to FIG. 4 or FIG. 5.

Specifically, functions/implementation processes of the obtaining unit 1301, the detection unit 1302, and the sending unit 1303 in FIG. 13 may be implemented by the processor 1101 in FIG. 11 by invoking the computer-executable instructions stored in the memory 1102. Alternatively, functions/implementation processes of the obtaining unit 1301 and the sending unit 1303 in FIG. 13 may be implemented using the transceiver 1104 in FIG. 11.

The user plane function network element 1300 provided in this embodiment may be configured to perform the method in the embodiment corresponding to FIG. 4 or FIG. 5. Therefore, for a technical effect that can be obtained in this embodiment, refer to the method embodiment corresponding to FIG. 4 or FIG. 5. Details are not described herein again.

In this embodiment, the UPF network element obtains the first rule, detects, from the target transmission data packet according to the first rule, the data packet for transmitting the non-C2 data, and can further feed, back to the SMF network element in a form of the first session report, information about the detected data packet for transmitting the non-C2 data, to implement detection on the data packet for transmitting the non-C2 data, and further enable a first network element to process the data packet for transmitting the non-C2 data. This prevents the data packet for transmitting the non-C2 data from being transmitted to the UAVC or the UAV.

Figure 14:
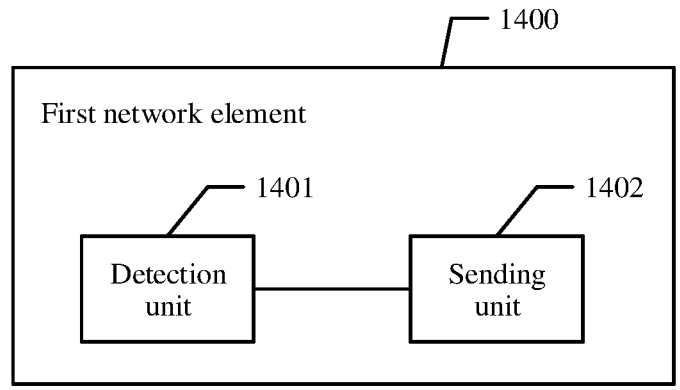
FIG. 14 is a schematic diagram of a hardware structure of a first network element according to an embodiment of this application.

For example, when each functional unit is obtained through division in an integrated manner, FIG. 14 is a schematic diagram of a structure of a first network element. As shown in FIG. 14, an embodiment of a first network element 1400 in this application may include a detection unit 1401 and a sending unit 1402.

The detection unit 1401 is configured to detect a flight behavior of an unmanned aerial vehicle (UAV).

The sending unit 1402 is configured to: when the flight behavior of the UAV is abnormal, send an abnormal data detection request to a session management function (SMF) network element, to indicate the SMF network element to provide a first rule for a user plane function (UPF) network element based on the abnormal data detection request, where the first rule indicates the UPF network element to detect, from a target transmission data packet, a data packet for transmitting a non-command and control (non-C2) data packet, and the target transmission data packet is a data packet between the UAV and an unmanned aerial vehicle controller (UAVC).

In some embodiments of this application, the first network element 1400 further includes:

a receiving unit 1403, configured to: after the sending unit 1402 sends the abnormal data detection request to the SMF network element, receive an abnormal traffic report sent by the SMF network element, where the abnormal traffic report includes one or more of identification information of the UAV, identification information of the UAVC, and identification information of an unmanned aerial system (UAS) including the UAV and the UAVC.

In some embodiments of this application, the abnormal data detection request further includes one or more of the identification information of the UAV, the identification information of the UAVC, the identification information of the unmanned aerial system (UAS) including the UAV and the UAVC, and a session identifier, and the session identifier indicates a session for data transmission between the UAV and the UAVC.

In some embodiments of this application, the sending unit 1402 is further configured to: before sending the abnormal data detection request to the SMF network element, send indication information to the UAV or the UAVC, where the indication information indicates the UAV or the UAVC to stop transmitting the non-C2 data.

The first network element 1400 provided in this embodiment is configured to perform the method performed by the first network element in the method embodiment corresponding to FIG. 4 or FIG. 5. Therefore, for understanding of this embodiment, refer to the related descriptions in the method embodiment corresponding to FIG. 4 or FIG. 5.

In this embodiment, the first network element 1400 is presented in a form of functional units divided through integration. The "functional unit" herein may be an application-specific integrated circuit (ASIC), a processor that executes one or more software or firmware programs and a memory, an integrated logic circuit, and/or another device that can provide the foregoing functions. In a simple embodiment, a person skilled in the art may figure out that the first network element 1400 may be in the form shown in FIG. 11.

For example, the processor 1101 in FIG. 11 may invoke the computer-executable instructions stored in the memory 1102, so that the first network element 1400 performs the method performed by the first network element in the method embodiment corresponding to FIG. 4 or FIG. 5.

Specifically, functions/implementation processes of the detection unit 1401 and the sending unit 1402 in FIG. 14 may be implemented by the processor 1101 in FIG. 11 by invoking the computer-executable instructions stored in the memory 1102. Alternatively, a function/an implementation process of the detection unit 1401 in FIG. 14 may be implemented by the processor 1101 in FIG. 11 by invoking the computer-executable instructions stored in the memory 1102; and a function/an implementation process of the sending unit 1402 in FIG. 14 may be implemented by the transceiver 1104 in FIG. 11.

The first network element 1400 provided in this embodiment may be configured to perform the method in the embodiment corresponding to FIG. 4 or FIG. 5. Therefore, for a technical effect that can be obtained in this embodiment, refer to the method embodiment corresponding to FIG. 4 or FIG. 5. Details are not described herein again.

In this embodiment, when determining that the flight behavior of the UAV is abnormal, the first network element indicates, using the abnormal data detection request, the SMF network element to provide the first rule for the UPF network element. This not only enables the UPF network element to detect the data packet for transmitting the non-C2 data, but also enables the first network element to process the data packet for transmitting the non-C2 data, to prevent the data packet for transmitting the non-C2 data from being transmitted to the UAVC or the UAV.

Figure 15:
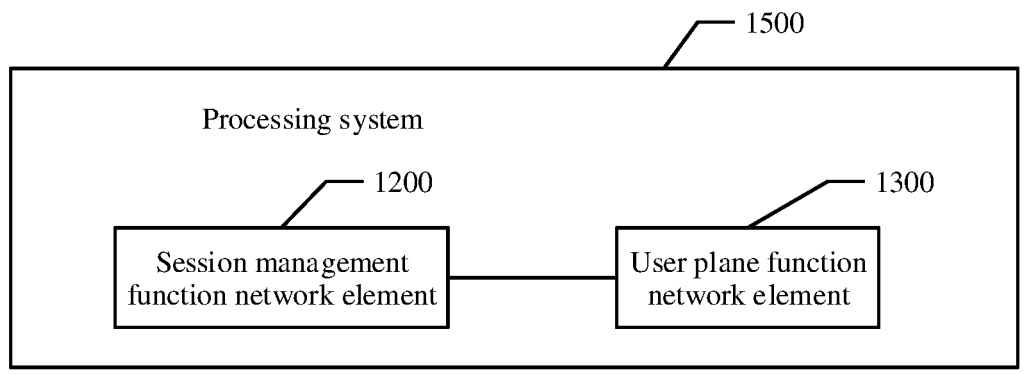
FIG. 15 is a schematic diagram of a structure of a processing system of an abnormally behaving unmanned aerial vehicle according to an embodiment of this application.

The SMF network element 1200, the UPF network element 1300, and the first network element 1400 are separately described above mainly from the perspective of the functional unit. In this application, the SMF network element 1200, the UPF network element 1300, and the first network element 1400 may alternatively be described from a perspective of system interaction. For example, FIG. 15 is a schematic diagram of a structure of a processing system of an abnormally behaving unmanned aerial vehicle. As shown in FIG. 15, an embodiment of a processing system 1500 in this application may include a session management function (SMF) network element 1200 and a user plane function (UPF) network element 1300.

The SMF network element 1200 is configured to provide a first rule for the UPF network element 1300, where the first rule indicates the UPF network element to detect, from a target transmission data packet, a data packet for transmitting non-command and control (non-C2) data, and the target transmission data packet is a data packet between an unmanned aerial vehicle (UAV) and an unmanned aerial vehicle controller (UAVC).

The UPF network element 1300 is configured to: obtain the first rule, detect, from the target transmission data packet according to the first rule, the data packet for transmitting the non-command and control (non-C2) data, and send a first session report to the SMF network element 1200.

The SMF network element 1200 is configured to: receive the first session report, and send an abnormal traffic report to a first network element based on the first session report, where the abnormal traffic report includes one or more of identification information of the UAV, identification information of the UAVC, and identification information of an unmanned aerial system (UAS) including the UAV and the UAVC.

Figure 16:
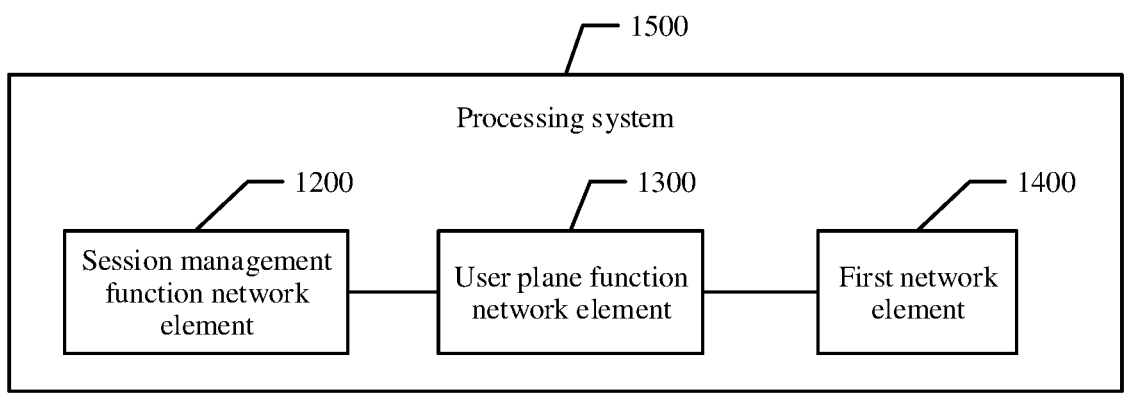
FIG. 16 is a schematic diagram of a structure of another processing system of an abnormally behaving unmanned aerial vehicle according to an embodiment of this application.

Based on the embodiment described in FIG. 15, refer to FIG. 16. FIG. 16 is a schematic diagram of a structure of another processing system of an abnormally behaving unmanned aerial vehicle according to an embodiment of this application. The processing system 1500 may further include a first network element 1400.

The first network element 1400 is configured to: detect a flight behavior of the unmanned aerial vehicle (UAV), and send an abnormal data detection request to the SMF network element 1200 when the flight behavior of the UAV is abnormal.

The SMF network element 1200 is configured to: before providing the first rule for the UPF network element 1300, receive the abnormal data detection request sent by the first network element 1400, and provide the first rule for the UPF network element 1300 based on the abnormal data detection request.

In some embodiments of this application, the SMF network element 1200 is configured to: determine a second rule based on an abnormal characteristic, and send the second rule to the UPF network element 1300, where the first session report includes the abnormal characteristic of the data packet for transmitting the non-C2 data, the abnormal characteristic includes one or more of abnormality of a data packet size, abnormality of a ratio of a quantity of uplink data packets to a quantity of downlink data packets, or abnormality of a transmission rate of the uplink/downlink data packet, the second rule indicates to process the data packet for transmitting the non-C2 data, the second rule includes one of a packet discarding rule, a cache rule, or a forwarding rule, the forwarding rule is for forwarding, to the first network element or a first apparatus, the data packet for transmitting the non-C2 data, and the first apparatus is a third-party entity configured to control the UAV.

The UPF network element 1300 is configured to: receive the second rule, and process, according to one of the packet discarding rule, the cache rule, or the forwarding rule, the data packet for transmitting the non-C2 data.

In some embodiments of this application, the SMF network element 1200 is configured to send a detection duration to the UPF network element 1300, so that the UPF network element 1300 detects, within the detection duration from the target transmission data packet according to the first rule, the data packet for transmitting the non-C2 data.

The UPF network element 1300 is configured to: receive the detection duration, and detect, within the detection duration from the target transmission data packet according to the first rule, the data packet for transmitting the non-C2 data.

In some embodiments of this application, the first network element 1400 is configured to: after sending the abnormal data detection request to the SMF network element 1200, receive the abnormal traffic report sent by the SMF network element 1200, where the abnormal traffic report includes one or more of the identification information of the UAV, the identification information of the UAVC, and the identification information of the unmanned aerial system (UAS) including the UAV and the UAVC.

In some embodiments of this application, the first network element 1400 is configured to: before sending the abnormal data detection request to the SMF network element 1200, send indication information to the UAV or the UAVC, where the indication information indicates the UAV or the UAVC to stop transmitting the non-C2 data.

Components in the devices in FIG. 12 to FIG. 14 of this application are communicatively connected. To be specific, a processing unit (or a processor), a storage unit (or a memory), and a transceiver unit (a transceiver) communicate with each other through an internal connection path, to transfer a control signal and/or a data signal. The foregoing method embodiments of this application may be applied to the processor, or the processor implements the steps of the foregoing method embodiments. The processor may be an integrated circuit chip and has a signal processing capability. In an implementation process, the steps of the foregoing method embodiments may be completed using a hardware integrated logic circuit in the processor, or using instructions in a form of software. The processor may be a central processing unit (CPU), a network processor (NP), a combination of a CPU and an NP, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logic block diagrams that are disclosed in this application. The general-purpose processor may be a microprocessor, or the processor may be any conventional processor or the like. The steps of the methods disclosed in this application may be directly executed and completed using a hardware decoding processor, or may be executed and completed using a combination of hardware and software modules in the decoding processor. The software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps of the foregoing methods in combination with hardware of the processor. Although only one processor is shown in the figure, the apparatus may include a plurality of processors, or the processor includes a plurality of processing units. Specifically, the processor may be a single-core (single-CPU) processor, or may be a multi-core (multi-CPU) processor.

The memory is configured to store computer instructions executed by the processor. The memory may be a storage circuit, or may be a memory. The memory may be a volatile memory or a non-volatile memory, or may include both a volatile memory and a non-volatile memory. The non-volatile memory may be a read-only memory, a programmable read-only memory, an erasable programmable read-only memory, an electrically erasable programmable read-only memory, or a flash memory. The volatile memory may be a random access memory, used as an external cache. The memory may be independent of the processor, or may be a storage unit in the processor. This is not limited herein. Although only one memory is shown in the figure, the apparatus may include a plurality of memories, or the memory includes a plurality of storage units.

The transceiver is configured to implement content interaction between the processor and another unit or network element. Specifically, the transceiver may be a communication interface of the apparatus, or may be a transceiver circuit or a communication unit. The transceiver may alternatively be a communication interface or a transceiver circuit of the processor. Optionally, the transceiver may be a transceiver chip. The transceiver may further include a sending unit and/or a receiving unit. In a possible implementation, the transceiver may include at least one communication interface. In another possible implementation, the transceiver may alternatively be a unit implemented in a form of software. In each embodiment of this application, the processor may interact with another unit or network element through the transceiver. For example, the processor obtains or receives content from another network element through the transceiver. If the processor and the transceiver are two physically separated components, the processor may exchange content with another unit of the apparatus without using the transceiver.

In a possible implementation, the processor, the memory, and the transceiver may be connected to each other through a bus. The bus may be a peripheral component interconnect (PCI) bus or an extended industry standard architecture (EISA) bus, or the like. The bus may be classified into an address bus, a data bus, a control bus, or the like.

In embodiments of this application, the term "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the term "example", "for example", or the like is intended to present a relative concept in a specific manner.

In embodiments of this application, for ease of understanding, a plurality of examples are used for description. However, these examples are merely examples, and it does not mean that these examples are optional implementations for implementing this application.

In embodiments of this application, for ease of description, a request message, a response message, and names of various other messages are used. However, these messages are merely used as examples to describe content that needs to be carried or a function that needs to be implemented. Specific names of the messages constitute no limitation on this application. For example, the messages may be a first message, a second message, and a third message. These messages may be some specific messages, or may be some fields in the messages. These messages may alternatively represent various service operations.

All or some of the foregoing embodiments may be implemented using software, hardware, firmware, or any combination thereof. When software is used for implementation, all or some of embodiments may be implemented in a form of a computer program product.

The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, and or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Disk (SSD)), or the like.

The technical solutions provided in this application are described in detail above. The principle and implementation of this application are described herein through specific examples. The description about embodiments is merely provided to help understand the method and core ideas of this application. In addition, a person of ordinary skill in the art can make variations and modifications to this application in terms of the specific implementations and application scopes according to the ideas of this application. Therefore, the content of specification shall not be construed as a limitation on this application.

What is claimed is:

1. A processing method of an abnormally behaving unmanned aerial vehicle, comprising:
    providing, by a session management function network element, a first rule for a user plane function network element, wherein the first rule indicates the user plane function network element to detect, from a target transmission data packet, a data packet for transmitting non-command and control (non-C2) data, and the target transmission data packet is a data packet between an unmanned aerial vehicle (UAV) and an unmanned aerial vehicle controller (UAVC);
    receiving, by the session management function network element, a first session report sent by the user plane function network element; and
    sending, by the session management function network element, an abnormal traffic report to a first network element based on the first session report, wherein the abnormal traffic report comprises one or more of identification information of the UAV, identification information of the UAVC, or identification information of an unmanned aerial system (UAS) comprising the UAV and the UAVC.

2. The method according to claim 1, wherein before the providing, by a session management function network element, a first rule for a user plane function network element, the method further comprises:
    receiving, by the session management function network element, an abnormal data detection request sent by the first network element; and
    the providing, by a session management function network element, a first rule for a user plane function network element comprises:
    providing, by the session management function network element, the first rule for the user plane function network element based on the abnormal data detection request.

3. The method according to claim 2, wherein the abnormal data detection request comprises at least one of the identification information of the UAV, the identification information of the UAVC, the identification information of the UAS, or a session identifier, and the session identifier indicates a session for data transmission between the UAV and the UAVC.

4. The method according to claim 1, wherein the first session report comprises an abnormal characteristic of the data packet for transmitting the non-C2 data, the abnormal characteristic comprises one or more of abnormality of a data packet size, abnormality of a ratio of a quantity of uplink data packets to a quantity of downlink data packets, or abnormality of a transmission rate of the uplink/downlink data packet, and the method further comprises:
    determining, by the session management function network element, a second rule based on the abnormal characteristic, wherein the second rule indicates to process the data packet for transmitting the non-C2 data, the second rule comprises one of a packet discarding rule, a cache rule, or a forwarding rule, the forwarding rule is for forwarding, to the first network element or a first apparatus, the data packet for transmitting the non-C2 data, and the first apparatus is a third-party entity configured to control the UAV; and
    sending, by the session management function network element, the second rule to the user plane function network element.

5. The method according to claim 1, wherein the first rule comprises one or more of a threshold of a data packet size, a threshold of a ratio of the quantity of uplink data packets to the quantity of downlink data packets, or a threshold of a transmission rate of the uplink/downlink data packet.

6. The method according to claim 1, further comprising:
    sending, by the session management function network element, a detection duration to the user plane function network element, so that the user plane function network element detects, within the detection duration from the target transmission data packet according to the first rule, the data packet for transmitting the non-C2 data.

7. The method according to claim 1, further comprising:
    obtaining, by the user plane function network element, the first rule;
    detecting, by the user plane function network element from the target transmission data packet according to the first rule, the data packet for transmitting non-command and control (non-C2) data; and sending, by the user plane function network element, the first session report to the session management function network element.

8. The method according to claim 1, further comprising:
determining, by the first network element, that a flight behavior of an unmanned aerial vehicle (UAV) is abnormal; and
sending, by the first network element, an abnormal data detection request to the session management function network element, to indicate the session management function network element to provide the first rule for the user plane function network element based on the abnormal data detection request.

9. The method according to claim 8, wherein before the sending, by the first network element, the abnormal data detection request to the session management function network element, the method further comprises:
sending, by the first network element, indication information to the UAV or the UAVC, wherein the indication information indicates the UAV or the UAVC to stop transmitting the non-C2 data.

10. A session management function network element, comprising:
at least one processor; and
a non-transitory computer-readable storage medium storing a program including instructions that, when executed by the at least one processor, cause the session management function network element to perform operations comprising:
providing a first rule for a user plane function network element, wherein the first rule indicates the user plane function network element to detect, from a target transmission data packet, a data packet for transmitting non-command and control (non C2) data, and the target transmission data packet is a data packet between an unmanned aerial vehicle (UAV) and an unmanned aerial vehicle controller (UAVC);
receiving a first session report sent by the user plane function network element; and
sending an abnormal traffic report to a first network element based on the first session report, wherein the abnormal traffic report comprises one or more of identification information of the UAV, identification information of the UAVC, and identification information of an unmanned aerial system (UAS) comprising the UAV and the UAVC.

11. The session management function network element according to claim 10, wherein the operations further include:
before providing the first rule for the user plane function network element, receiving an abnormal data detection request sent by the first network element; and
wherein the providing the first rule for a user plane function network element comprising: providing the first rule for the user plane function network element based on the abnormal data detection request.

12. The session management function network element according to claim 10, wherein the first session report comprises an abnormal characteristic of the data packet for transmitting the non-C2 data, the abnormal characteristic comprises one or more of abnormality of a data packet size, abnormality of a ratio of a quantity of uplink data packets to a quantity of downlink data packets, or abnormality of a transmission rate of the uplink/downlink data packet, and the operations further include:
determining a second rule based on the abnormal characteristic, wherein the second rule indicates to process the data packet for transmitting the non-C2 data, the second rule comprises one of a packet discarding rule, a cache rule, or a forwarding rule, the forwarding rule is for forwarding, to the first network element or a first apparatus, the data packet for transmitting the non-C2 data, and the first apparatus is a third-party entity configured to control the UAV, and
sending the second rule to the user plane function network element.

13. The session management function network element according to claim 10, wherein the first rule comprises one or more of a threshold of a data packet size, a threshold of a ratio of the quantity of uplink data packets to the quantity of downlink data packets, and a threshold of a transmission rate of the uplink/downlink data packet.

14. The session management function network element according to claim 10, wherein the sending the abnormal traffic report to the first network element comprises:
sending a detection duration to the user plane function network element, so that the user plane function network element detects, within the detection duration from the target transmission data packet according to the first rule, the data packet for transmitting the non-C2 data.

15. A processing system of an abnormally behaving unmanned aerial vehicle, wherein the processing system comprises a session management function network element and a user plane function network element, wherein
the session management function network element is configured to provide a first rule for the user plane function network element, wherein the first rule indicates the user plane function network element to detect, from a target transmission data packet, a data packet for transmitting non-command and control (non-C2) data, and the target transmission data packet is a data packet between an unmanned aerial vehicle (UAV) and an unmanned aerial vehicle controller (UAVC);
the user plane function network element is configured to: obtain the first rule, detect, from the target transmission data packet according to the first rule, the data packet for transmitting the non-command and control (non C2) data, and send a first session report to the session management function network element; and
the session management function network element is further configured to: receive the first session report, and send an abnormal traffic report to a first network element based on the first session report, wherein the abnormal traffic report comprises one or more of identification information of the UAV, identification information of the UAVC, or identification information of an unmanned aerial system (UAS) comprising the UAV and the UAVC.

16. The processing system according to claim 15, wherein the processing system further comprises the first network element, wherein
the first network element is configured to: detect a flight behavior of the unmanned aerial vehicle (UAV), and send an abnormal data detection request to the session management function network element when the flight behavior of the UAV is abnormal; and
the session management function network element is further configured to: before providing the first rule for the user plane function network element, receive the abnormal data detection request sent by the first network element, and provide the first rule for the user plane function network element based on the abnormal data detection request.

17. The processing system according to claim 16, wherein the first network element is further configured to: after sending the abnormal data detection request to the session management function network element, receive the abnormal traffic report sent by the session management function network element, wherein the abnormal traffic report comprises one or more of the identification information of the UAV, the identification information of the UAVC, or the identification information of the UAS.

18. The processing system according to claim 16, wherein the first network element is further configured to: before sending the abnormal data detection request to the session management function network element, send indication information to the UAV or the UAVC, wherein the indication information indicates the UAV or the UAVC to stop transmitting the non-C2 data.

19. The processing system according to claim 15, wherein the session management function network element is further configured to: determine a second rule based on an abnormal characteristic, and send the second rule to the user plane function network element, wherein the first session report comprises the abnormal characteristic of the data packet for transmitting the non-C2 data, the abnormal characteristic comprises one or more of abnormality of a data packet size, abnormality of a ratio of a quantity of uplink data packets to a quantity of downlink data packets, or abnormality of a transmission rate of the uplink/downlink data packet, the second rule indicates to process the data packet for transmitting the non-C2 data, the second rule comprises one of a packet discarding rule, a cache rule, or a forwarding rule, the forwarding rule is for forwarding, to the first network element or a first apparatus, the data packet for transmitting the non-C2 data, and the first apparatus is a third-party entity configured to control the UAV; and the user plane function network element is further configured to: receive the second rule, and process, according to one of the packet discarding rule, the cache rule, or the forwarding rule, the data packet for transmitting the non-C2 data.

20. The processing system according to claim 15, wherein the session management function network element is further configured to send a detection duration to the user plane function network element, so that the user plane function network element detects, within the detection duration from the target transmission data packet according to the first rule, the data packet for transmitting the non-C2 data; and the user plane function network element is further configured to: receive the detection duration, and detect, within the detection duration from the target transmission data packet according to the first rule, the data packet for transmitting the non-C2 data.

* * * * *

UNITED STATES PATENT AND TRADEMARK OFFICE
CERTIFICATE OF CORRECTION

PATENT NO. : 12,323,845 B2  
APPLICATION NO. : 17/986189  
DATED : June 3, 2025  
INVENTOR(S) : Chengchen Zhang et al.

Page 1 of 2

It is certified that error appears in the above-identified patent and that said Letters Patent is hereby corrected as shown below:

In the Specification

Column 3, Lines 41-47, change "The SMF network element determines a second rule based on the abnormal rule, the forwarding rule is for forwarding, to the first network element or a first apparatus, the data packet for transmitting the non-C2 data, and the first apparatus is a third-party entity configured to control the UAV; and" to --The SMF network element determines a second rule based on the abnormal characteristic, where the second rule indicates to process the data packet for transmitting the non-C2 data, the second rule includes one of a packet discarding rule, a cache rule, or a forwarding rule, the forwarding rule is for forwarding, to the first network element or a first apparatus, the data packet for transmitting the non-C2 data, and the first apparatus is a third-party entity configured to control the UAV; and--.

Column 7, Lines 65-68 and Column 8, Lines 1-5, change "a determining unit, configured to determine a second rule based on the abnormal rule, the forwarding rule is for forwarding, to the first network element or a first apparatus, the data packet for transmitting the non-C2 data, and the first apparatus is a third-party entity configured to control the UAV, where the sending unit is configured to send the second rule to the IPS network element." to --a determining unit, configured to determine a second rule based on the abnormal characteristic, where the second rule indicates to process the date packet for transmitting the non-C2 data, the second rule includes one a packet discarding rule, or a cache rule, or a forwarding rule, the forwarding, to the first network element or a first apparatus, the data packet for transmitting the non-C2 data, and the first apparatus is a third-party entity configured to control the UAV, where the sending unit is configured to send the second rule to the IPS network element.--.

Column 43, Lines 49-22, change "a determining unit, configured to determine a second rule based on the abnormal rule, the forwarding rule is for forwarding, to the first network element or a first apparatus, the data packet for transmitting the non-C2 data, and the first apparatus is a third-party entity configured to control the UAV; where the sending until 1203 is configured to send the second rule to the UPF network element." to --a determining unit, configured to determine a second rule based on the abnormal characteristic, where the second rule indicates to process the data packet for transmitting the non-C2 data, the second rule includes one of a packet discarding rule, a cache rule, or Signed and Sealed this  
Fifth Day of August, 2025

Coke Morgan Stewart  
*Acting Director of the United States Patent and Trademark Office* a forwarding rule, the forwarding rule is for forwarding, to the first network element or a first apparatus, the data packet for transmitting the non-C2 data, and the first apparatus is a third-party entity configured to control the UAV; where the sending unit is configured to send the second rule to the IPS network element.--.